(12) United States Patent
Im et al.

(10) Patent No.: US 9,965,015 B2
(45) Date of Patent: May 8, 2018

(54) DIGITAL DEVICE AND METHOD OF PROCESSING SCREENSAVER THEREOF

(71) Applicant: LG ELECTRONICS INC., Seoul (KR)

(72) Inventors: Changwook Im, Seoul (KR); Kihoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 507 days.

(21) Appl. No.: 14/632,744

(22) Filed: Feb. 26, 2015

(65) Prior Publication Data

US 2015/0241939 A1 Aug. 27, 2015

Related U.S. Application Data

(60) Provisional application No. 61/945,097, filed on Feb. 26, 2014.

(30) Foreign Application Priority Data

Jul. 17, 2014 (KR) ........................ 10-2014-0090368

(51) Int. Cl.
| | |
|---|---|
| *G06F 3/048* | (2013.01) |
| *G06F 1/32* | (2006.01) |
| *G06F 3/14* | (2006.01) |
| *H04N 21/443* | (2011.01) |
| *G09G 3/20* | (2006.01) |

(52) U.S. Cl.
CPC .......... *G06F 1/3206* (2013.01); *G06F 1/3265* (2013.01); *G06F 3/14* (2013.01); *G09G 3/20* (2013.01); *H04N 21/4436* (2013.01); *H04N 21/4438* (2013.01); *G09G 2320/046* (2013.01); *Y02B 60/1242* (2013.01)

(58) Field of Classification Search
CPC combination set(s) only.
See application file for complete search history.

(56) References Cited

U.S. PATENT DOCUMENTS

| | | | |
|---|---|---|---|
| 6,486,900 | B1 | 11/2002 | Shen et al. |
| 2003/0169306 | A1 | 9/2003 | Makipaa et al. |
| 2006/0236337 | A1 | 10/2006 | Zoller et al. |

(Continued)

FOREIGN PATENT DOCUMENTS

| | | |
|---|---|---|
| CN | 101471059 A | 7/2009 |
| CN | 101490656 A | 7/2009 |

(Continued)

*Primary Examiner* — Hien L Duong
(74) *Attorney, Agent, or Firm* — Dentons US LLP

(57) ABSTRACT

A digital device and a method of processing screensaver application in the digital device are disclosed. The digital device includes a manager to manage a display window of the digital device and to generate and to transmit a plurality of status data of the digital device to a controller, and the controller to receive a first signal from a first application requesting registration as an application voter, to transmit a second signal requesting a confirmation related to execute a second application to the first application when first status data is received from a service interface, to receive a response to the second signal from the first application, and to execute the second application to enter a screensaver mode based on the received response.

26 Claims, 17 Drawing Sheets

(56) References Cited

U.S. PATENT DOCUMENTS

| | | | |
|---|---|---|---|
| 2007/0277127 A1 | 11/2007 | Carlson et al. | |
| 2008/0026798 A1 | 1/2008 | Kim | |
| 2009/0089825 A1* | 4/2009 | Coldwell | H04L 12/66 725/25 |
| 2009/0172607 A1* | 7/2009 | Dai | G09G 3/20 715/867 |
| 2010/0060789 A1 | 3/2010 | Aoki et al. | |
| 2010/0086277 A1* | 4/2010 | Craner | H04N 5/76 386/278 |
| 2010/0313172 A1* | 12/2010 | Hirahara | G06F 1/3218 715/867 |
| 2011/0022993 A1* | 1/2011 | Ohno | G06F 3/1454 715/867 |
| 2014/0157211 A1* | 6/2014 | Tian | G06F 3/14 715/867 |

FOREIGN PATENT DOCUMENTS

| | | |
|---|---|---|
| CN | 102799261 A | 11/2012 |
| CN | 202548753 U | 11/2012 |
| EP | 1947851 A2 | 7/2008 |
| JP | 2000-163034 A | 6/2000 |
| JP | 2013-101363 A | 5/2013 |
| KR | 10-2011-0121173 A | 11/2011 |

\* cited by examiner

FIG. 13
|  | Full Screen Saver | PIG Screen Saver |
|---|---|---|
| Video Full Screen & Paused | | |
| Video PIG & Playing | | o |
| Video PIG & Paused | | |
| UI only no video & No interaction | o | |
| System Timeout | | |
FIG. 14
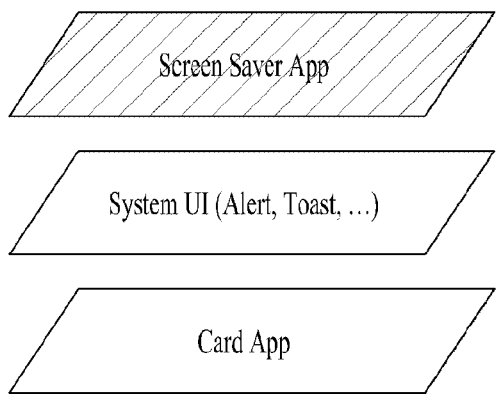
FIG. 15
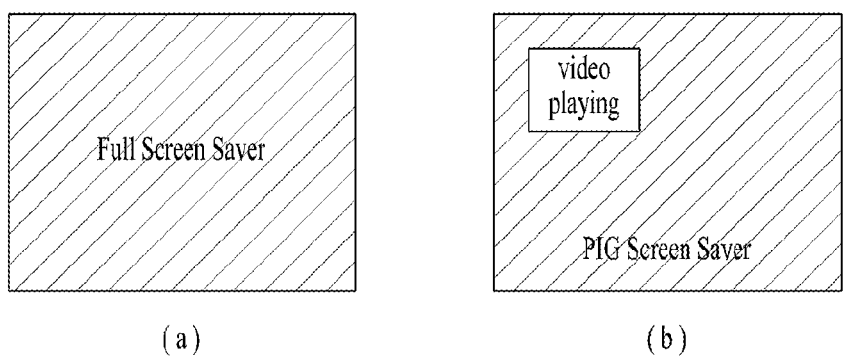
(a)          (b)

FIG. 17

| Run-time | Object Type | | Video Object | Input Type | Input Stack |
|---|---|---|---|---|---|
| webKit | Video Tag | | TV video Tag | RF based | TV service |
| | | | DVR watch Video Tag | RF based | TV service |
| | | | External Input Video Tag | RF based | TV service |
| | | | media video tag | URI based | Media Server |
| | | | extended media video tag (camera, VCS) | URI based | Media Server |
| | NPAPI Plug-in | | media plug-in (NC Backward Compatibility) | URI based | Media Server |
| | | | broadcast plug-in (NC Backward Compatibility) | RF based | TV service |
| | Private | | Youtube MSE/EME | Memory based | LibmediaAPI.so |
| NDK | | | NDL Media | URI based | Media Server |
| | | | NC API (NC Backward Compatibility) | I don't know | I don't know |
| Native app | | | Chromium | URI based | Media Server |
| | Private | | Netflix, Vudu | Memory based | LibmediaAPI.so |
| LB6 | | | media plug-in for Data Broadcast | URI based | Media Server |
| | | | Broadcast plug-in for Data Broadcast | RF based | TV service |

DIGITAL DEVICE AND METHOD OF PROCESSING SCREENSAVER THEREOF

This application claims the benefit of U.S. Provisional Application No. 61/945,097, filed on Feb. 26, 2014, and Korean Patent Application No. 10-2014-0090368 filed on Jul. 17, 2014 in Korea, which are hereby incorporated by references.

BACKGROUND OF THE INVENTION

Field of the Invention

The present invention relates to a digital device and, more particularly, to a digital device for processing a screensaver and a method of processing a screensaver.

Discussion of the Related Art

Subsequent to stationary devices such as a personal computer (PC) or a television (TV), mobile devices such as a smartphone or a tablet PC have been remarkably developed. Although stationary devices and mobile devices have been independently developed in respective areas, recently, the areas of the stationary devices and the mobile devices are becoming ambiguous according to a boom in digital convergence.

In addition, with development and environmental changes of such digital device development, requirements of users have been also gradually increased and diversified and thus requests to support various high-end services or applications have been increased.

Due to such environmental changes of the digital device, panel burn-in can occur in a device in association with provision of various high-quality services or applications. To solve such burn-in, the device uses a screensaver. However, even when the screensaver is used, if the device supports multitasking of high-end services or applications, according to conventional methods, the screensaver does not operate according to the statuses of the services or applications, the status of the device or user's intention, thereby obstructing use of the device by a user and inconveniencing the user.

SUMMARY OF THE INVENTION

Accordingly, embodiments of the present invention are directed to a digital device and a method of processing screensaver thereof that substantially obviate one or more problems due to limitations and disadvantages of the related art.

An object of the present invention devised to solve the problem lies in a method of adaptively controlling or processing a screensaver in consideration of a status of a service or application of a digital device.

Another object of the present invention devised to solve the problem lies in a method of adaptively controlling or processing a screensaver if a digital device supports multitasking.

A further object of the present invention devised to solve the problem lies in adaptive processing of a screensaver according to a status of a digital device based on burn-in, power consumption reduction and user's intention.

The technical problems solved by the present invention are not limited to the above technical problems and other technical problems which are not described herein will become apparent to those skilled in the art from the following description.

Additional advantages, objects, and features of the invention will be set forth in the disclosure herein as well as the accompanying drawings. Such aspects can also be appreciated by those skilled in the art based on the disclosure herein.

The object of the present invention can be achieved by providing a method of controlling a digital device includes receiving, by a controller, a first signal from a first application requesting registration as an application voter, transmitting, by the controller, a second signal requesting a confirmation related to execute a second application to the first application when first status data is received from a service interface, receiving, by the controller, a response to the second signal from the first application, and executing, by the controller, the second application to enter a screensaver mode based on the received response.

In another aspect of the present invention, provided herein is a digital device includes a manager to manage a display window of the digital device and to generate and to transmit a plurality of status data of the digital device to a controller, and the controller to receive a first signal from a first application requesting registration as an application voter, to transmit a second signal requesting a confirmation related to execute a second application to the first application when first status data is received from a service interface, to receive a response to the second signal from the first application, and to execute the second application to enter a screensaver mode based on the received response.

The technical solutions which can be obtained by the present invention are not limited to the above-described technical solutions, and other technical solutions which are not described herein will be understood by one of ordinary skill in the art based on the detailed description of the present invention.

According to one of various embodiments of the present invention, it is possible to provide a method of adaptively controlling or processing a screensaver in consideration of a status of a service or application of a digital device. According to another embodiment of the present invention, it is possible to provide a method of adaptively controlling or processing a screensaver if a digital device supports multitasking. According to another embodiment of the present invention, it is possible to adaptively process a screensaver according to a status of a digital device based on burn-in, power consumption reduction and user's intention. Thus, it is possible to provide convenience to users and to improve product satisfaction.

Effects obtainable from the present invention can be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 13 is a diagram illustrating a screen server launch condition according to one embodiment of the present invention;

FIG. 14 is a diagram illustrating an operation structure of a screensaver according to one embodiment of the present invention;

FIG. 15 is a diagram illustrating fullscreen screensaver and PIG screensaver operation screens according to one embodiment of the present invention;

FIG. 17 is a diagram illustrating a video object related to screensaver processing according to one embodiment of the present invention;

DETAILED DESCRIPTION OF THE INVENTION

Figure 1:
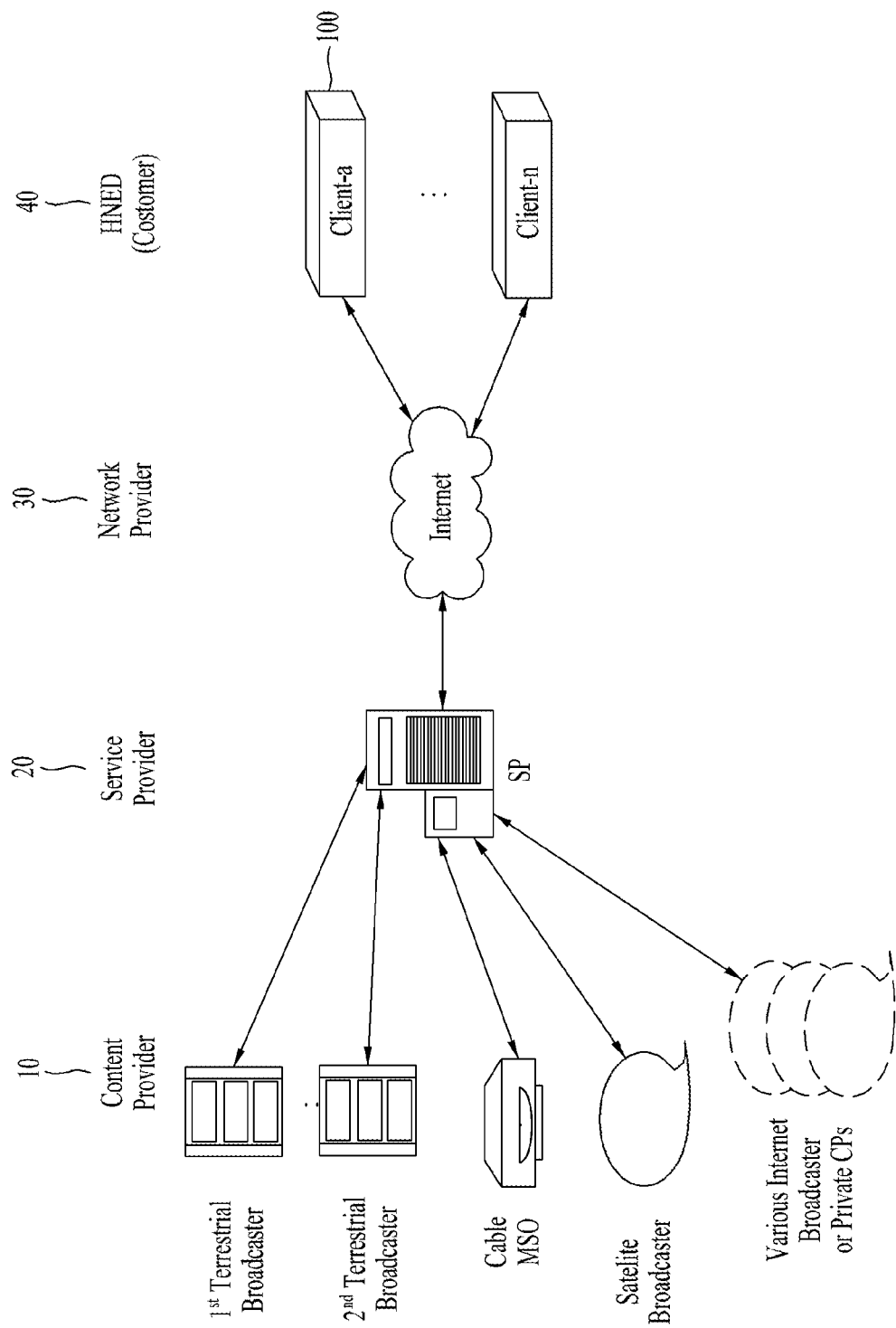
FIG. 1 is a schematic diagram illustrating a service system including a digital device according to one embodiment of the present invention.

Description will now be given in detail according to exemplary embodiments disclosed herein, with reference to the accompanying drawings. For the sake of brief description with reference to the drawings, the same or equivalent components can be provided with the same reference numbers, and description thereof will not be repeated.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first-', 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Vide on Demand or streaming service, and service server providing pay services.

In this application, when application is described for the convenience of explanation, the meaning of application in the context can include services as well as applications.

In the following description, various embodiments according to the present invention are explained with reference to attached drawings.

FIG. 1 illustrates a broadcast system including a digital receiver according to an embodiment of the present invention.

Referring to FIG. 1, examples of a broadcast system comprising a digital receiver can include a content provider (CP) 10, a service provider (SP) 20, a network provider (NP) 30, and a home network end user (HNED) (Customer) 40. The HNED 40 includes a client 100, that is, a digital receiver.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof can be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

According to the present invention, a digital device can include a manager to manage a display window of the digital device and to generate and to transmit a plurality of status data of the digital device to a controller and the controller to receive a first signal from a first application requesting registration as an application voter, to transmit a second signal requesting a confirmation related to execute a second application to the first application when first status data is received from a service interface, to receive a response to the second signal from the first application, and to execute the second application to enter a screensaver mode based on the received response.

Here, the first application includes at least one of an application including video data and an application not including video data, and wherein the second application is an application dedicated to the screensaver mode. The controller generates a video object when the first application is an application including the video data. The first signal is received from the application when video data is generated or when the video object is generated. And, the controller determines whether or not the first application or the generated object is in a list related to the registration which is prestored in a memory and reserve or reject the registration when the first application or the generated object is not included in the list. The first status data is generated by a timeout status in which any input to the digital device is not received during a predetermined time. The controller receives second status data for the corresponding video data from the generated video object when the received response is received. The second status data for the corresponding video data includes at least one of a size of the outputted video data, an area or a location of the outputted video data, and video status data, the video status data including information indicating a reproduction or stop of the video data. The controller only executes the second application when the received second signal includes a signal of acking. Also, the controller launches the second application and executes the second application at an uppermost layer on a screen via the launched second application. The second application determines any one of a fullscreen and a picture in graphic (PIG) to execute the screensaver mode. The controller receives a third signal requesting to release execution of the second application and transmits a control command in response to the received third signal to the second application. The third signal includes at least one of user input for releasing a timeout status corresponding to the first status data, an external input manager (EIM) signal, a physical device manager (PDM) signal, and a not watch service signal. The first application transmits the first signal when the application is located in a foreground, and wherein the first application does not transmit the first signal when the first application is located in a background.

Figure 2:
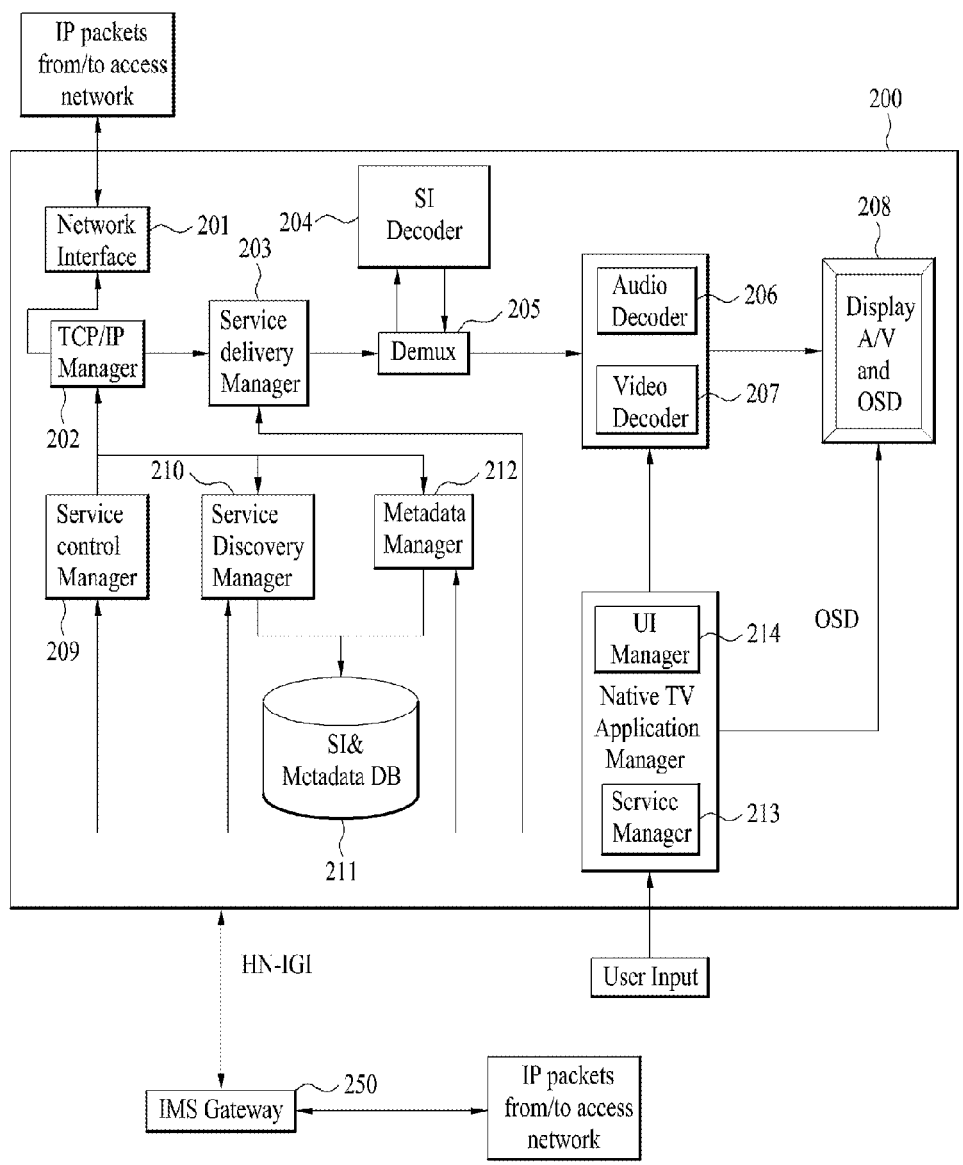
FIG. 2 is a block diagram showing a digital device according to one embodiment of the present invention.
Figure 3:
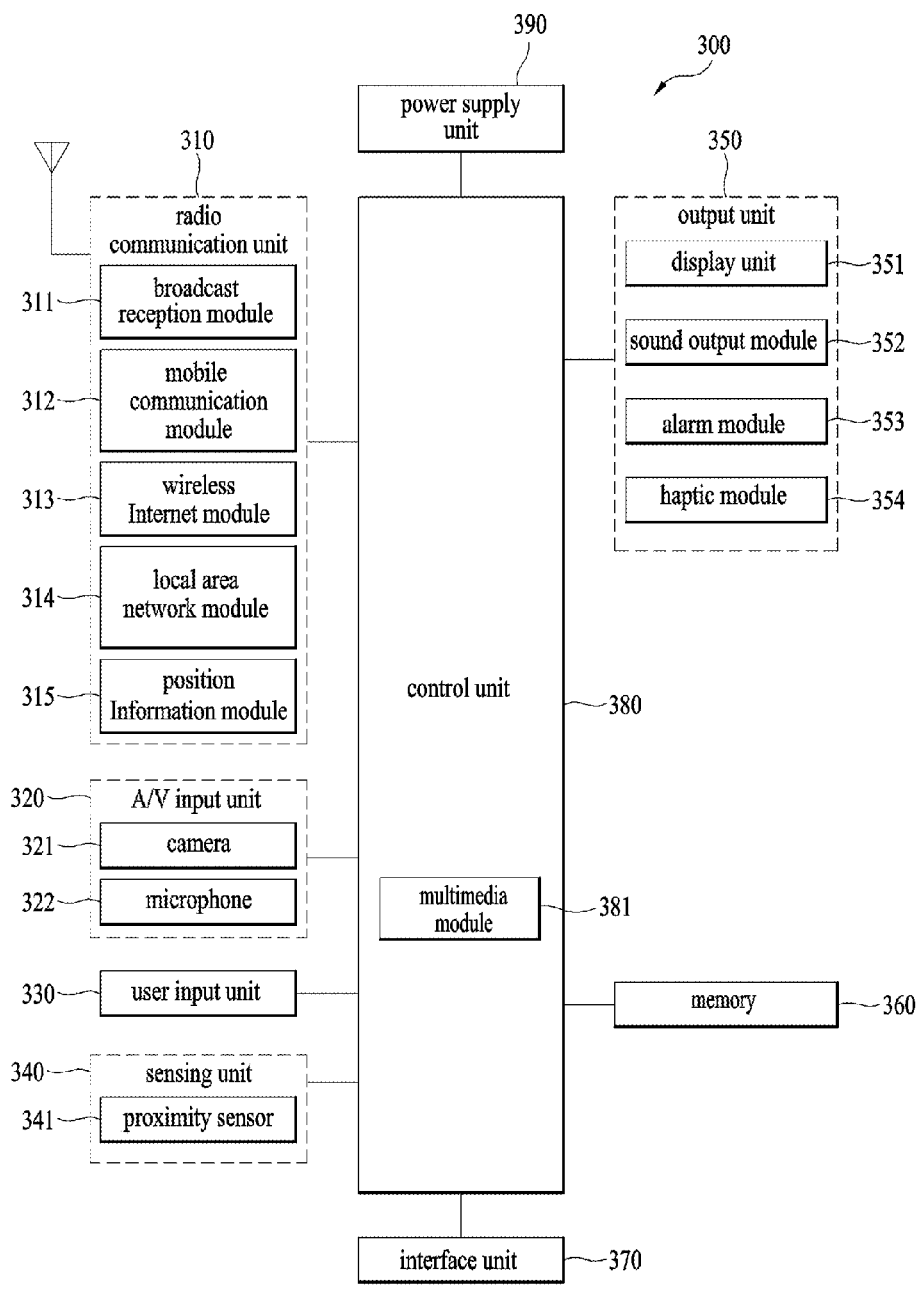
FIG. 3 is a block diagram showing the configuration of a digital device according to another embodiment of the present invention.

FIG. 2 is a schematic diagram of a digital receiver 200 according to an embodiment of the present invention. The digital receiver 200 can correspond to the client 100 shown in FIG. 1.

The digital receiver 200 can include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 can involve delivery of IP packets transmitted to the digital receiver 200 and IP packets transmitted from the digital receiver 200, that is, packet delivery between a source and a destination. The TCP/IP manager 202 can classify received packets according to an appropriate protocol and output the classified packets to the service delivery manager 205, the service discovery manager 210, the service control manager 209, and the metadata manager 212.

The service delivery manager 203 can control classification and processing of service data. The service delivery manager 203 can control real-time streaming data, for example, using real-time protocol/real-time control protocol (RTP/RTCP). In other words, the service delivery manager 203 can parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204.

The SI decoder 204 can parse and/or decode SI data such as program specific information (PSI), program and system information protocol (PSIP), digital video broadcast-service information (DVB-SI), etc. The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data can be provided to the user through the display unit 208.

The application manager can include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 can control and manage service-related managers such as the service delivery manager 203, the service discovery manager 210, the service control manager 209, and the metadata manager 212.

The service manager 213 can configure a channel map and enable channel control at the request of the user on the basis of the channel map. The service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service on the basis of the received signal.

The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 can include functions required to access an IMS based IPTV services.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components can be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel can include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal can be implemented as a TV broadcast signal, a radio broadcast signal, and/or a data broadcast signal, among other signals. If desired, the broadcast signal can further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information can include an electronic program guide (EPG) of digital multimedia broadcasting (DMB) and an electronic service guide (ESG) of digital video broadcast-handheld (DVB-H).

The broadcast receiving module 311 can be configured to receive broadcast signals transmitted from various types of broadcast systems. By non-limiting example, such broadcasting systems can include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals can carry audio, video, and data according to text/multimedia messages.

The wireless Internet module 313 supports Internet access for the mobile terminal 300. This module can be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 can be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module can be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices.

Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 can additionally or alternatively display images which are associated with these modes, the UI or the GUI.

The display module 351 can be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 can include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen can be named 'proximity touch' and an action of enabling the pointer to actually come into contact with the touch screen can named 'contact touch'. And, a position, at which the proximity touch is made to the touch screen using the pointer, can mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 can be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 can be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 can be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 can be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 can include a multimedia module 381 that provides multimedia playback. The multimedia module 381 can be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power can be internal power, external power, or combinations of internal and external power.

Various embodiments described herein can be implemented in a computer-readable medium using, for example, computer software, hardware, or some combination of computer software and hardware. For a hardware implementation, the embodiments described herein can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments can also be implemented by the controller 180.

For a software implementation, the embodiments described herein can be implemented with separate software modules, such as procedures and functions, each of which performs one or more of the functions and operations described herein. The software codes can be implemented with a software application written in any suitable programming language and can be stored in memory such as the memory 160, and executed by a controller or processor, such as the controller 380.

Figure 4:
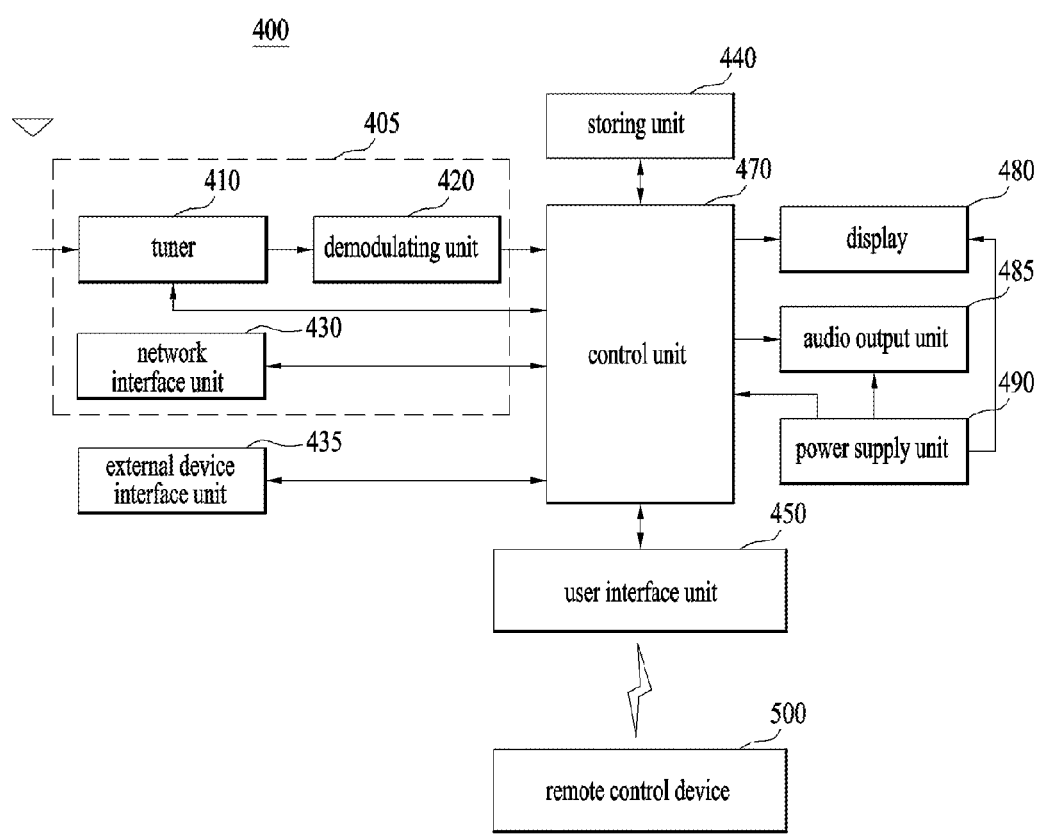
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention can include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 can include at least one of one or more tuner 410, a demodulator 420, and a network interface 430.

The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is subjected to the tuner 410 and demodulated by the demodulator 420, and a signal received through the network interface 40.

In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal by tuning to a channel selected by the user from among RF broadcast signals received through an antenna or all previously stored channels.

The demodulator 420 can receive a digital IF (Intermediate Frequency) signal (DIF) converted by the tuner 410 and demodulate the DIF signal.

A stream signal output from the demodulator 420 can be input to the controller 470.

The controller 470 can control demultiplexing, audio/video signal processing, etc. Furthermore, the controller 470 can control output of an image through the display unit 480 and output of audio through the audio output unit 485.

The external device interface 435 can provide an environment for interfacing external devices with the digital receiver 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit can include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 can provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 can store programs for signal processing and control and store a processed video, audio or data signal.

In addition, the storage unit 440 can execute a function of temporarily storing a video, audio or data signal input from the external device interface 435 or the network interface 430.

The storage unit 440 can store information about a predetermined broadcast channel through a channel memory function.

The storage unit 440 can store an application or a list of applications input from the external device interface 435 or the network interface 430.

The storage unit 440 can store various platforms which will be described later.

The storage unit 440 can include storage media of one or more types, such as a flash memory type, a hard disk type, a multimedia card micro type, a card type memory (e.g. SD or XD memory), RAM, EEPROM, etc.

The digital receiver 400 can reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 can be included in the controller 470.

The user input interface 450 can transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown).

Here, the sensing unit (not shown) can include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 can include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 can control the tuner 410 to receive a signal of a channel selected in response to a predetermined channel selection command received through the user input interface 450. In addition, the controller 470 can process a video, audio or data signal corresponding to the selected channel. The controller 470 can control information on a channel selected by the user to be output with a processed video or audio signal through the display unit 480 or the audio output unit 485.

Alternatively, the controller 470 can control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content can be content stored in the digital receiver 400, received broadcast content, or content input from an external device. The content can include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 can further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 can convert a video signal, a data signal, and an OSD signal processed by the controller 470 and a video signal and a data signal received from the external device interface 435 into RGB signals to generate driving signals.

The display unit 480 can be a PDP, an LCD, an OLED, a flexible display, a 3D display or the like.

The display unit 480 can be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 can further include the sensing unit (not shown) for sensing a gesture of the user, which includes at least one of a touch sensor, a voice sensor, a position sensor, and an action sensor, as described above.

A signal sensed by the sensing unit (not shown) can be delivered to the controller 470 through the user input interface 450.

The digital receiver 400 can further include the photographing unit (not shown) for photographing the user. Image information acquired by the photographing unit (not shown) can be supplied to the controller 470.

The controller 470 can sense a gesture of the user from an image captured by the photographing unit (not shown) or a signal sensed by the sensing unit (not shown), or by combining the image and the signal.

The power supply unit 490 can supply power to the digital receiver 400.

Particularly, the power supply unit 490 can supply power to the controller 470 which can be implemented as a system-on-chip (SoC), the display unit 480 for displaying images, and the audio output unit 485 for audio output.

The remote controller 500 can transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 can be omitted or a component (not shown in FIG. 2) can be added as required. The digital receiver according to the present invention can not include the tuner and the demodulator, differently from the digital receivers shown in FIGS. 2 and 4, and can receive content through the network interface or the external device interface and reproduce the content.

Figure 5:
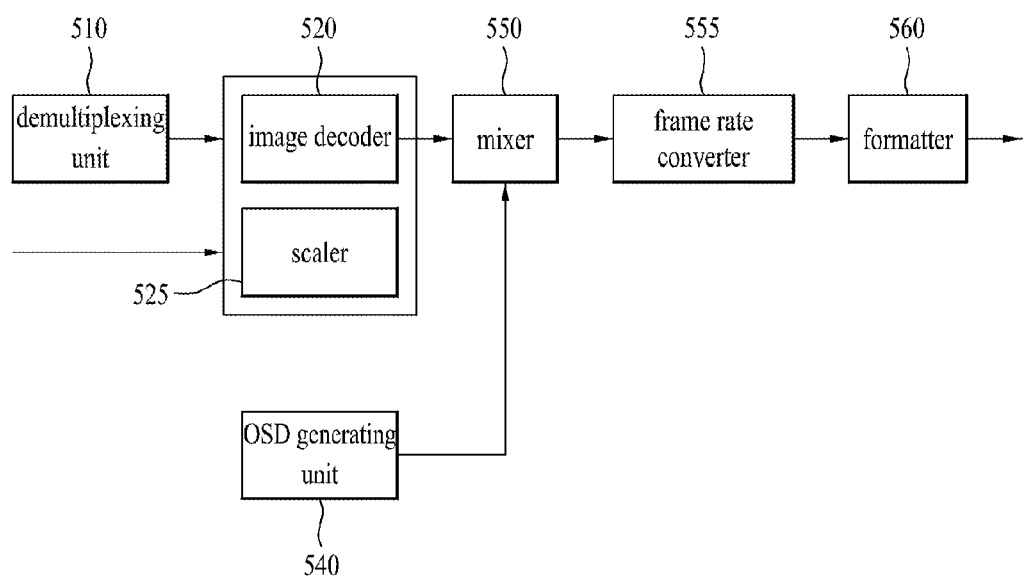
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 through 4.

The digital receiver according to the present invention can include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The image signal decoded by the image processor 520 can be input to the mixer 550.

The OSD generator 540 can generate OSD data automatically or according to user input. For example, the OSD generator 540 can generate data to be displayed on the screen of an output unit in the form of an image or text on the basis of a control signal of a user input interface.

OSD data generated by the OSD generator 540 can include various data such as a user interface image of the digital receiver, various menu screens, widget, icons, and information on ratings. The OSD generator 540 can generate a caption of a broadcast image or data for displaying EPG based broadcast information.

The mixer 550 can mix the OSD data generated by the OSD generator 540 and the image signal processed by the image processor 520. The mixer 550 can provide the mixed signal to the 3D formatter 560. By mixing the decoded image signal and the OSD data, OSD can be overlaid on a broadcast image or external input image.

The frame rate converter (FRC) 555 can convert a frame rate of input video. For example, the frame rate converter 555 can convert the frame rate of an input 60 Hz video to a frame rate of 120 Hz or 240 Hz, according to an output frequency of the output unit. The frame rate converter 555 can be bypassed when frame conversion is not executed.

The 3D formatter 560 can change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) can audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal can be EPG information including broadcast information such as the start time and end time (or duration) of a broadcast program which is broadcast through each channel.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital receiver is an example of image signal processors which process an image stored therein or an input image. Other examples of the image signal processors can include a set-top box (STB) which does not include the display unit 380 and the audio output unit 485 shown in FIG. 4, a DVD player, a Blu-ray player, a game device, a computer, etc.

Figure 6:
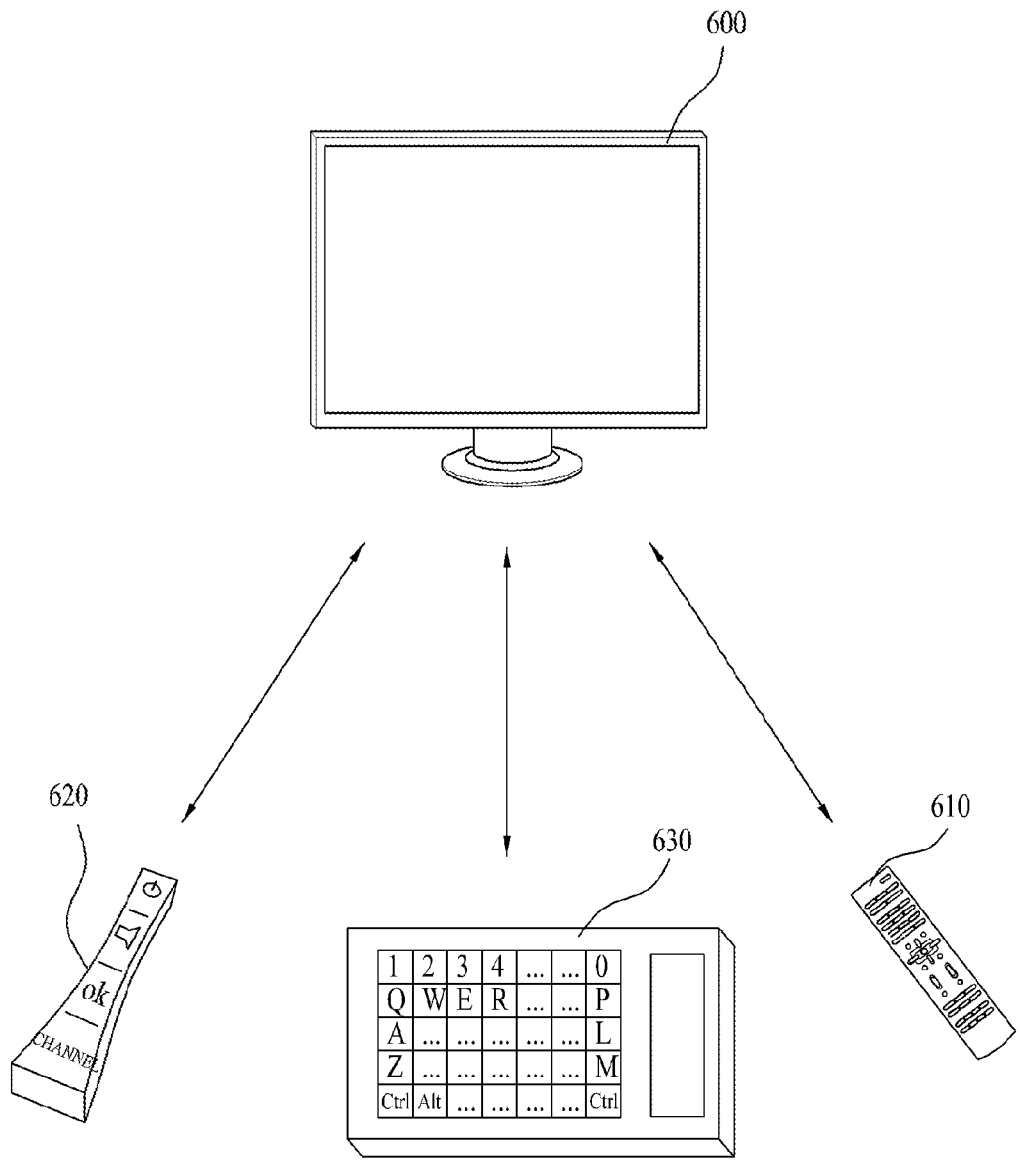
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 can include a gyro sensor mounted therein to sense vibration of a user's hand or rotation.

That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification uses webOS as a platform. Hereinafter, a webOS based process or algorithm can be performed by the controller of the above-described digital device.

The controller includes the controllers of FIGS. 2 to 5 and has wide concepts. Accordingly, hereinafter, a component for processing webOS based services, applications, content, etc., including software, firmware or hardware in a digital device is referred to a controller.

Such a webOS based platform can improve development independency and functional extensibility by integrating services, applications, etc. based on a Luna-service bus, for example, and increase application development productivity based on web application framework. In addition, system resources, etc. can be efficiently used via a webOS process and resource management to support multitasking.

A webOS platform described in the present specification can be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
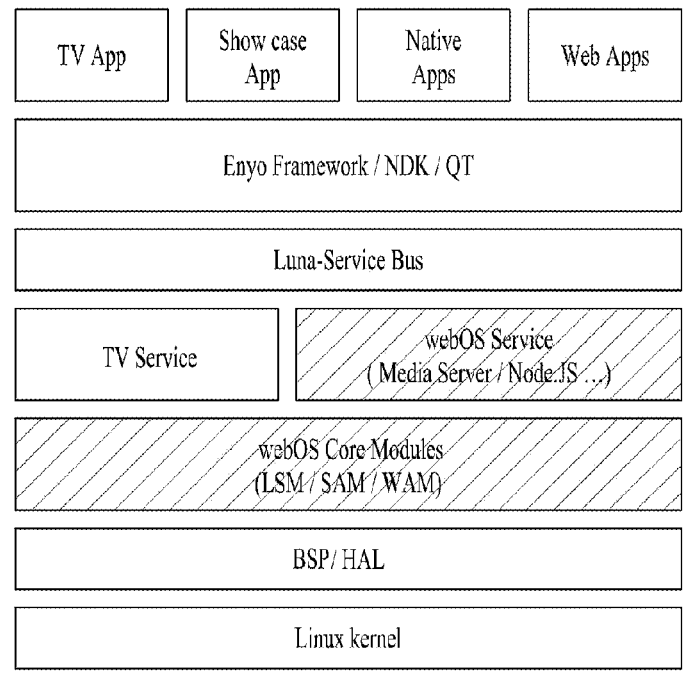
FIG. 7 is a diagram illustrating webOS architecture according to one embodiment of the present invention.

FIG. 7 is a diagram illustrating webOS architecture according to one embodiment of the present invention.

The architecture of a webOS platform will now be described with reference to FIG. 7.

The platform can be largely divided into a kernel, a system library based webOS core platform, an application, a service, etc.

The architecture of the webOS platform has a layered structure. OSs are provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a webOS core modules layer, a service layer, a Luna-service bus layer and an Enyo framework/native developer's kit (NDK)/QT layer are sequentially provided. At the highest layer, an application layer is provided.

Some layers of the above-described webOS layered structure can be omitted and a plurality of layers can be combined to one layer and one layer can be divided into a plurality of layers.

The webOS core module layer can include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM can control display hardware (HW) and provide a buffer for rendering content necessary for applications, and compose and output results of rendering a plurality of applications on a screen.

The SAM manages policy according to several conditions of systems and applications.

The WAM is based on Enyo framework, because a webOS regards a web application as a basic application.

An application can use a service via a Luna-service bus. A service can be newly registered via a bus and the application can detect and use a desired service.

The service layer can include services having various service levels, such as a TV service, a webOS service, etc. The webOS service can include a media server, Node.JS, etc. and, in particular, the Node.JS service supports JavaScript, for example.

The webOS service can be communicated to a Linux process implementing function logic via a bus. This webOS service is largely divided into four parts, migrates from a TV process and an existing TV to a webOS, is developed as services which differ between manufacturers, webOS common services and JavaScripts, and is composed of the Node.js service used via Node.js.

The application layer can include all applications supportable by a digital device, such as a TV application, a showcase application, a native application, a web application, etc.

Applications on the webOS can be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or can be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application can be used to develop applications requiring high performance.

The QML application is a Qt based native application and includes basic applications provided along with the webOS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
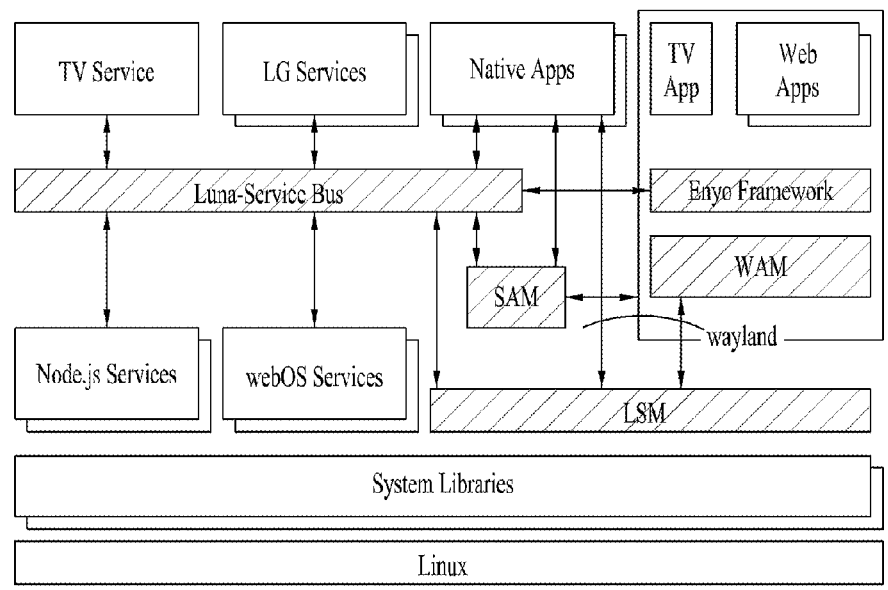
FIG. 8 is a diagram illustrating architecture of a webOS device according to one embodiment of the present invention.

FIG. 8 is a diagram illustrating the architecture of a webOS device according to one embodiment of the present invention.

FIG. 8 is a block diagram based on a runtime of a webOS device and is described with reference to the layered structure of FIG. 7.

Hereinafter, a description will be given with reference to FIGS. 7 and 8.

Referring to FIG. 8, services, applications and webOS core modules are included on a system OS (Linux) and system libraries and communication therebetween can be performed via a Luna-service bus.

Node.js services based on HTML5 such as e-mail, contact or calendar, CSS, JavaScript, etc., webOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via webOS core modules such as the above-described SAM, WAM and LSM via the Luna-service bus. The TV applications and the web applications are not necessarily based on Enyo framework or related to UI.

The CBOX can manage metadata and lists of content of external devices such as USB drivers, DLNA devices or Cloud servers connected to a TV. The CBOX can output content listing of various content containers such as USB, DMS, DVR, Cloud server, etc. as an integrated view. The CBOX can display various types of content listings such as pictures, music or video and manage metadata thereof. The CBOX can output content of an attached storage in real time. For example, if a storage device such as a USB is plugged in, the CBOX should immediately output a content list of the storage device. At this time, a standardized method for processing the content listing can be defined. The CBOX can accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multi-tasking if a plurality of application screens is composed using an app-on-app method and can provide a window management mechanism for 21:9 and a multi-window.

The LSM supports implementation of a system UI based on a QML and improves development productivity. QML UX can easily configure a view using a screen layout and UI components based on MVC and easily develop code for processing user input. An interface between the QML and the webOS component is achieved via a QML extensibility plug-in and graphic operation of an application can be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. can be included as an input manager.

The LSM supports multiple window models and can be simultaneously executed in all applications as a system UI. The LSM can support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
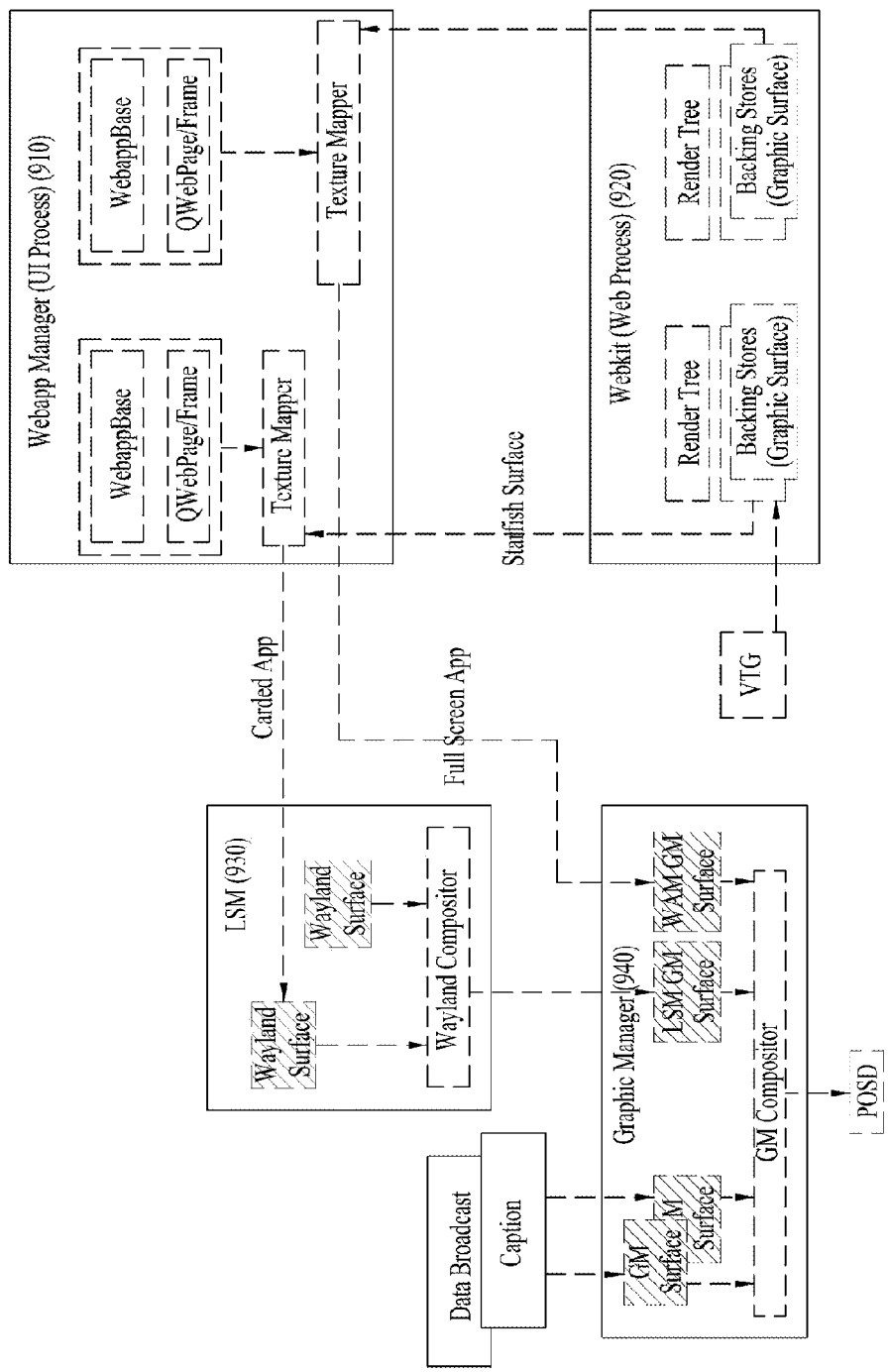
FIG. 9 is a diagram illustrating a graphic composition flow in a webOS device according to one embodiment of the present invention.

FIG. 9 is a diagram illustrating a graphic composition flow in a webOS device according to one embodiment of the present invention.

Referring to FIG. 9, graphic composition processing can be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 can bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the webOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
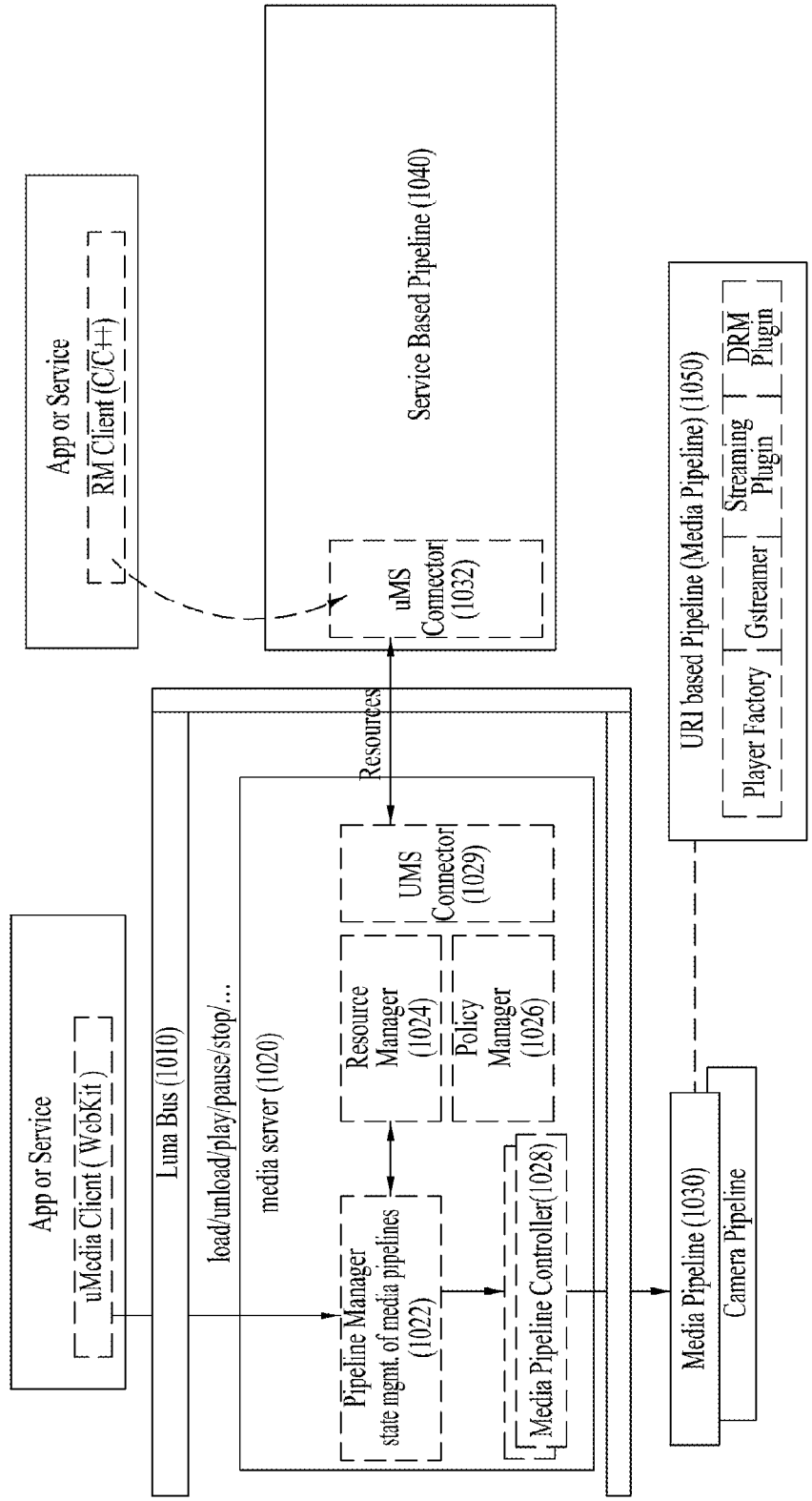
FIG. 10 is a diagram illustrating a media server according to one embodiment of the present invention.
Figure 11:
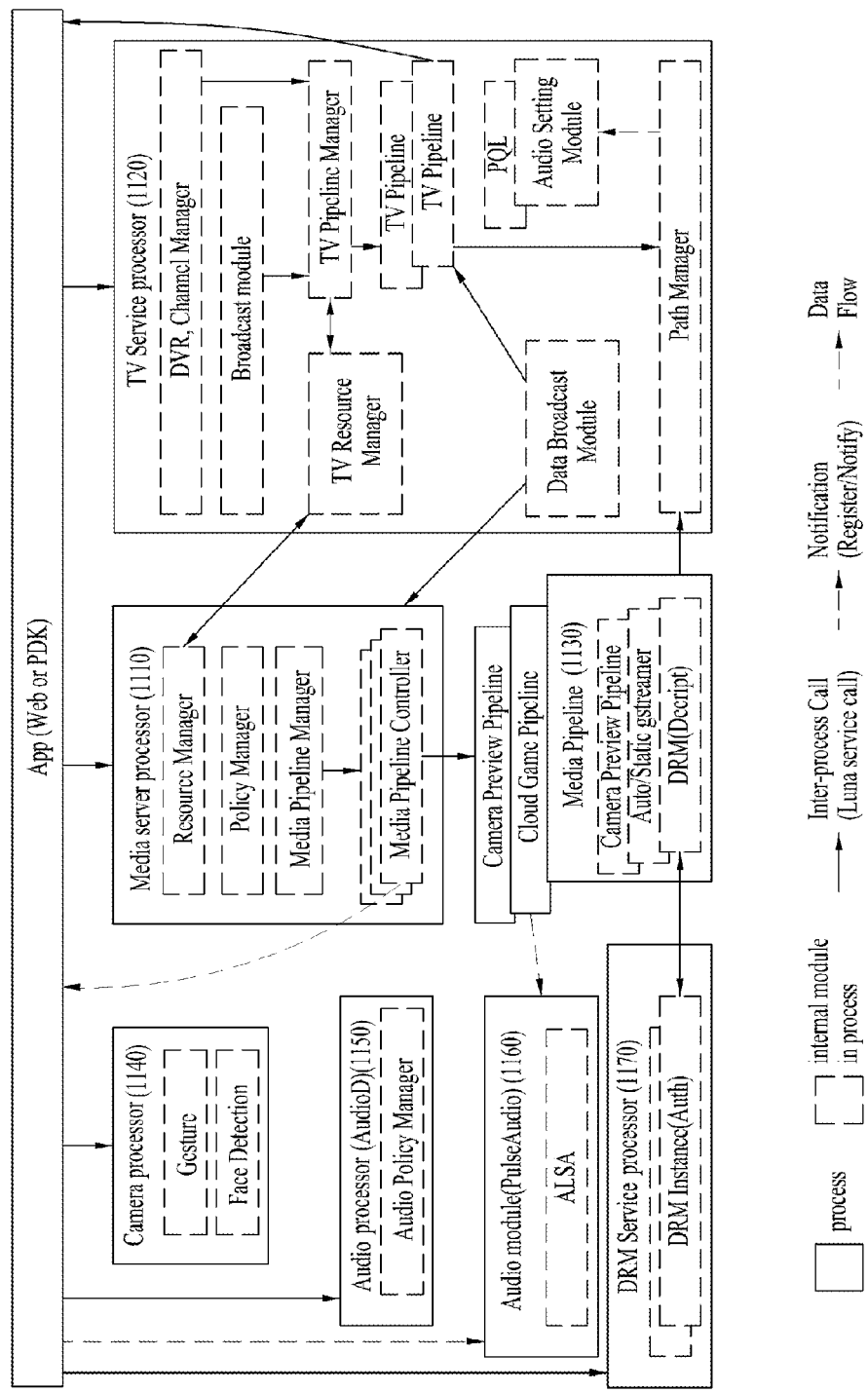
FIG. 11 is a block diagram showing the configuration of a media server according to one embodiment of the present invention.
Figure 12:
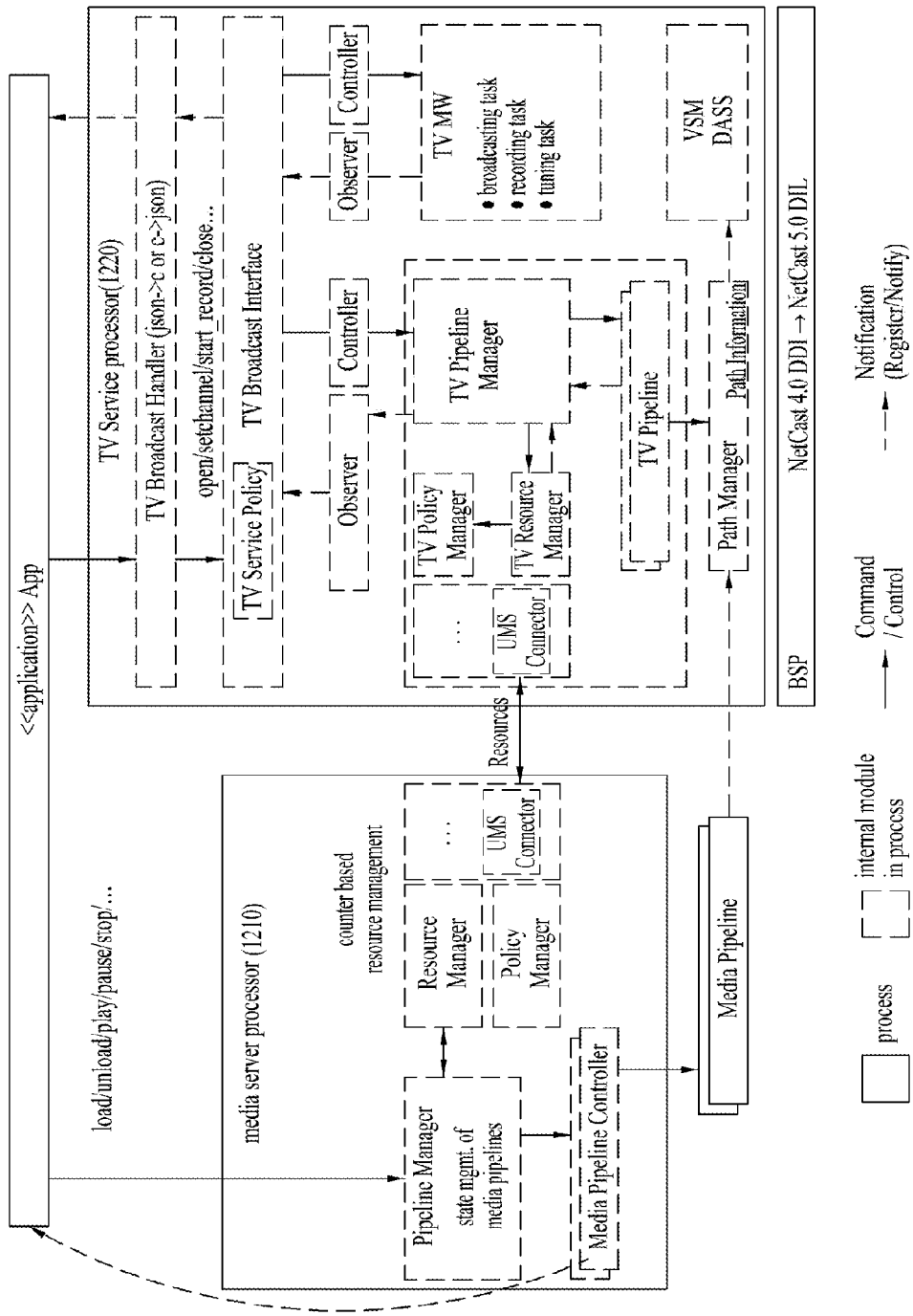
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server can efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server can make system stability robust, and can remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions can be changed according to media type, etc.

The media server can have extensibility and can add a new type of pipeline without influencing an existing implementation method. For example, the media server can accommodate a camera pipeline, a video conference (Skype) pipeline, a third-party pipeline, etc.

The media server can process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server can control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server can have identifiers (IDs) for all operations related to playback. For example, the media server can send a command to a specific pipeline based on the ID. The media server can send respective commands to pipelines for playback of two or more media.

The media server is responsible for playing back a HTML5 standard media.

The media server performs a service process of a TV pipeline according to a TV restructuralization range. The media server can be designed and implemented regardless of the TV restructuralization range. If the separate service process of the TV is not performed, the TV can be wholly re-executed when errors occurs in a specific task.

The media server is also referred to as • MS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server can manage pipeline controller resources.

The media server supports extensibility, reliability, efficient resource usage, etc., for example.

In other words, the • MS, that is, the micro media server, manages and controls resource usage for appropriate processing within the webOS device, such as resources such as cloud game, MVPD (pay service, etc.), camera preview, second screen or Skype, and TV resources. A pipeline is used upon usage of each resource, for example, and the media server can manage and control generation, deletion, use of a pipeline for resource management.

The pipeline can be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and can exchange data with the media server 1020 or the pipeline via the clients.

The clients include a • Media client (WebKit) for connection with the media server 1020 and a resource manager (RM) client (C/C++), for example.

The application including the • Media client is connected to the media server 1020 as described above. More specifically, the • Media client corresponds to the below-described video object, for example, and uses the media server 1020, for video operation by a request, etc.

The video operation relates to a video status and can include all status data related to the video operation, such as loading, unloading, play (playback or reproduction), pause, stop, etc. Such video operations or statuses can be processed by generating individual pipelines. Accordingly, the • Media client transmits status data related to the video operation to the pipeline manager 1022 in the media server.

The media server 1022 acquires information about resources of the current device via data communication with the resource manager 1024 and requests assignment of resources corresponding to the status data of the • Media client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment can be appropriately performed according to priority comparison of the policy manager 1026.

The pipeline manager 1022 requests to generate a pipeline for operation according to the request of the • Media client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop can be generated. The pipeline includes pipelines for HTML5, web CP, Smarthshare playback, thumbnail extraction, NDK, cinema, multimedia and hypermedia information coding experts group (MHEG), etc.

The pipeline can include a service-based pipeline and a URI based pipeline (media pipeline), for example.

Referring to FIG. 10, the application or service including the RM client can not be directly connected to the media server 1020, because the application or service can directly process a media. In other words, if the application or service directly processes a media, the media server can not be used. At this time, for pipeline generation and usage, resource management is necessary and, at this time, a • MS connector is used. When a resource management request for direct media processing of the application or service is received, the • MS connector communicates with the media server 1020 including the resource manager 1024. The media server 1020 also includes a • MS connector.

Accordingly, the application or service can cope with the request of the RM client via resource management of the resource manager 1024 via the • MS connector. The RM client can process services such as native CP, TV service, second screen, flash player, You Tube media source extensions (MSE), cloud game, Skype, etc. In this case, as described above, the resource manager 1024 can manage resources via appropriate data communication with the policy manager 1026 if necessary for resource management.

The URI based pipeline does not directly process the media unlike the above-RM client but processes the media via the media server 1020. The URI based pipeline can include player factory, Gstreamer, streaming plug-in, digital rights management (DRM) plug-in pipelines.

An interface method between the application and the media services is as follows.

An interface method using a service in a web application can be used. In this method, a Luna call method using a palm service bridge (PSB) and a method of using Cordova can be used, in which a display is extended to a video tag. In addition, a method of using HTML5 standard related to a video tag or media element can be used.

A method of using a service in PDK can be used.

Alternatively, a method of using in existing CP can be used. For backward compatibility, plug-in of an existing platform can be extended and used based on Luna.

Lastly, an interface method using a non-webOS can be used. In this case, a Luna bus can be directly called to perform interfacing.

Seamless change is processed by a separate module (e.g., TVWIN) and refers to a process of first displaying a TV program on a screen without a webOS before or duration webOS booting and then performing seamless processing. This is used for the purpose of first providing a basic function of a TV service, for fast response to a power-on request of a user, because a booting time of a webOS is late. The module is a part of a TV service process and supports seamless change for providing fast booting and a basic TV function, factory mode, etc. The module is responsible for switching from the non-webOS mode to the webOS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 can generate a pipeline via a media server processor 1110 with respect to data which requires use of a pipeline according to user selection or automatically and process the data.

Alternatively, if the application includes audio data, the audio can be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 can include an audio policy manager to determine processing of the audio data. The processed audio data is processed by the audio module 1160. The application or a pipeline related thereto can notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 can include a TV broadcast handler, a TV broadcast interface, a service processor, TV middleware (MW), a path manager and a BSP (NetCast). The service processor can mean a module including a TV pipeline manager, a TV resource manager, a TV policy manager, a USM connector, etc., for example.

In the present specification, the TV service processor can have the configuration of FIG. 11 or FIG. 12 or a combination thereof. Some components can be omitted or other components (not shown) can be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface can transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager can be controlled by the TV policy manager, in order to request a resource assignment status for a TV service according to a request for generation of a TV pipeline of the TV pipeline manager, and can perform data communication with the media server processor 1110/1210 via a • MS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager can be notified that assignment of all resources is completed. At this time, the resource manager in the media server processor can remove a predetermined TV pipeline according to a predetermined criterion or priority of TV pipelines already assigned for the TV service along with notification and request generation of a TV pipeline for the requested TV service. Alternatively, the TV resource manager can appropriately remove a TV pipeline or can add or newly establish a TV pipeline according to a status report of the resource manager in the media server processor 1110/1210.

The BSP supports backward compatibility with an existing digital device.

The generated TV pipelines can appropriately operate under control of the path manager in the processing procedure. The path manager can determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. can be generated. The media pipeline can include streaming protocol, auto/static gstreamer, DRM, etc. and the processing flow thereof can be determined under control of the path manager. For a detailed description of the processing procedure of the media server processor 1110/1210, refer to the description of FIG. 10 and a repeated description will be omitted. In the present specification, the resource manager in the media server processor 1110/1210 can perform resource management to a counter base, for example.

Hereinafter, various embodiments of a digital device for processing a screensaver according to the present invention will be described in greater detail with reference to the accompanying drawings.

In the digital device, the screensaver is used to solve a screen burn-in of a panel and can be executed according to a request or setting via a hot key of an input device such as a remote controller or according to an energy mode set by a user via a setting menu of the device.

A digital device according to the present invention can provide an adaptive screensaver to provide user convenience in consideration of execution or multitasking status of services or applications, an overall status of the device or device use intention or status of a user, in addition to solution of a screen burn-in.

The screensaver can be related to power control of the device. Recently, although battery capacity of a mobile device has increased and power control technology of a mobile or fixed device has been developed, a power control issue of the device still occurs with high end or high output of services or applications of the device. The present invention considers power saving technology via power control via a screensaver in addition to the above description. In other words, a screensaver processing method according to the present invention can save power of a device.

FIG. 13 is a diagram illustrating a screensaver launching condition according to one embodiment of the present invention.

The screensaver can be differently processed depending on whether or not a service or application executed on a device includes video.

If a service or application including video is executed on a device, there are a full-video status and a picture in graphic (PIG) video status.

The former status, that is, the full-video status includes a status in which video is executed on a full screen, that is, a reproduction status or a playback status, and a status in which a still image is displayed on a full screen, or an idle status, that is, a pause or stop status, of a video on a full screen. In the former status, that is, in the full-video playback status, the screen can not be switched to a screensaver but, in the latter status, that is, the pause or stop status, the screen can be switched to a fullscreen screensaver.

The latter status, that is, the PIG status, includes a status in which video is executed in a PIP area, that is, a playback status, and a status in which a still image is displayed in a PIP area or an idle status, that is, a pause or stop status. If video is played back in a PIG status, unlike the above-described full-video screen, the screen can be switched to a PIG screensaver. If a video is not played back in the PIG status, that is, in the pause or stop status, the screen can be switched to a PIG screensaver or a fullscreen screensaver.

In addition, timeout can be applied to a video status or a UI for the video if the UI is a system UI or native application but can not be applied to the video status or the UI for the video if the UI is a CP or third-party application. Timeout is one of reference data for a screensaver operation and a detailed description thereof will be given below.

If only the UI is output on the screen without the video, the screensaver can be switched to a fullscreen screensaver.

The above description relates to screensaver entrance related to execution, operation or processing of the screensaver in the digital device. Next, screensaver leaving or releasing will be described. In the present specification, entrance is equal or similar to execution and leaving can mean execution end, execution cancellation, and execution release.

After entering a screensaver or a screensaver function, if external input is received via a mouse, a keyboard, a local key, HDMI/RGB/composite/component/USB, etc., if a signal such as a reserved recording time start signal, a voice command, a gesture command signal, etc. is received or if an input device responds, the screensaver can be released. The screensaver can be released upon emergency call.

FIG. 14 is a diagram illustrating an operation structure of a screensaver according to one embodiment of the present invention.

Referring to FIG. 14, in the present invention, a webOS based application can execute a screensaver or perform a screensaver function at an uppermost level, for example. That is, a screensaver application is located at an upper layer or a top layer higher than a system UI or a card application, such as alert or alarm or toast popup.

Since the screensaver is released by stopping execution of an application operating at the uppermost level, a foreground or background service or application which has been executed before switching to the screensaver is not influenced.

FIG. 15 is a diagram illustrating fullscreen screensaver and PIG screensaver operation screens according to one embodiment of the present invention.

Referring to FIG. 15, according to switching to a screensaver, the digital device turns a screen off (black screen) while maintaining sound or displays "graphic+screensaver" (not shown) on a screen, such that a user confirms switching to the screensaver. In addition, the digital device displays a left time as a counter before switching to the screen server according to user's intention, thereby preventing a screensaver function from being unintentionally performed.

Hereinafter, various embodiments of the present invention related to a detailed method or scenario for processing a screensaver will be described in detail with reference to the accompanying drawings.

Figure 16:
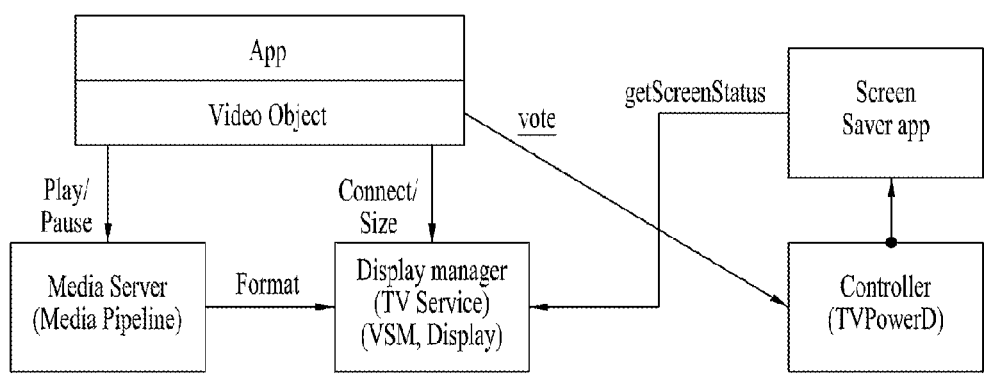
FIG. 16 is a block diagram illustrating a screensaver processing method according to one embodiment of the present invention.

FIG. 16 is a block diagram illustrating a screensaver processing method according to one embodiment of the present invention.

FIG. 16 shows the configuration of the screensaver processing method according to one embodiment of the present invention.

Here, FIG. 16 relates to a voting scenario as a screensaver processing method according to the present invention.

For example, referring to FIG. 16, an application 1610 including a video object 1615 registers a voter related to screensaver processing with a controller 1620 upon execution thereof. At this time, the controller 1620 can be hardware or software, which can be implemented by a service daemon. In addition, the video object can include NPAPI, video tag, DNK, Netflix, Vudu, HBBTV, etc.

The controller 1620 can perform screensaver processing via a screensaver application 1630 if application registration is performed.

In the above process, the screensaver application 1630 uses information on a current screen status of the device, for screensaver processing under control of the controller 1620. The screensaver application 1630 transmits an application programming interface (API) "getScreenStatus" to a display manager 1640.

The display manager 1640 functions as a display renderer and receives size data of a video object upon connection with the video object 1615 of the application 1610 and responds to the API "getScreenStatus" of the screensaver application 1630.

The video object 1615 of the application transmits current status data of the video object to a media server 1650. The transmitted status data can indicate play/pause of the video object.

The media server 1650 generates a pipeline based on the status data when the status data is received from the video object 1615.

The media server 1650 sends the status (format) data of the video object 1615 to the display manager 1640 simultaneously with or independently of generation of the pipeline.

At this time, the display manager 1640 combines the status (format) data of the video object received from the media server 1650 with the size data and responds to the API "getScreenStatus" of the screensaver application 1630.

In summary, the application 1610 registers a voter with the controller 1620 and the screensaver application 1630 receives response data to the API "getScreenStatus" from the display manager 1640. The controller 1620 controls the screensaver application 1630 after registration of the voter of the application 1610 and transmits a control command for function execution, thereby launching a screensaver function.

FIG. 17 is a diagram illustrating a video object related to screensaver processing according to one embodiment of the present invention.

FIG. 17 shows a video object related to screensaver processing of FIG. 16.

Referring to FIG. 17, the video object can be largely divided into WebKit, NDK, native application and live broadcast based on runtime.

First, in association with WebKit runtime, the video object can be largely divided into object types such as video tag, NPAPI plug-in and private.

The video object belonging to a video tag type can include TV video tag, DVR watch video tag, external input video tag, media video tag and extended media video tag, etc. Each video object can be based on RF or URI and can have input stacks such as a TV service or a media server according to video object.

The video object belonging to the NPAPI plug-in can include media plug-in, broadcast plug-in, etc. This video object can be based on RF or URI and can have input stacks such as a TV service or a media server.

The video object belonging to private can include You Tube MSE/EME, etc. This video object can be based on a memory and can have an input stack such as LibmediaAPI.so.

Next, the video object belonging to NDK runtime can include NDL media, NC API, etc. This video object can be based on URI and can have an input stack such as media server.

The object types of native application and live broadcast runtime are private and the video object belonging thereto can include Chormium, Netflix, Vudu, media plug-in for data broadcast, broadcast plug-in for data broadcast, etc. These video objects can be based on URI, memory and RF and can have input stacks such as media server, TV service, LibmediaAPI.so, etc.

Figure 18:
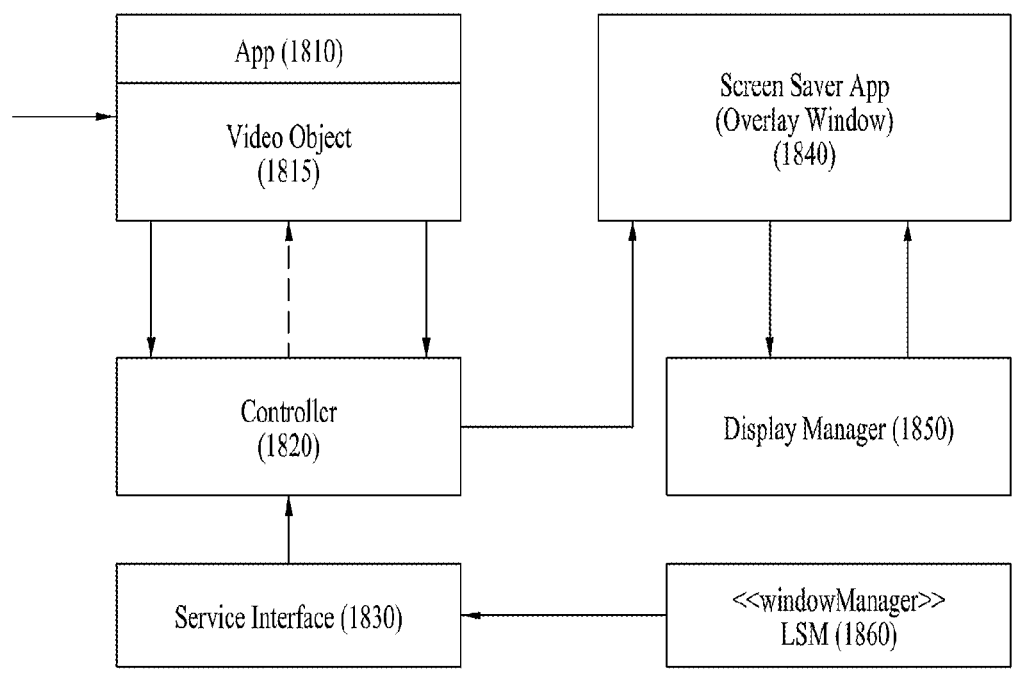
FIG. 18 is a block diagram showing the screensaver processing configuration including the components shown in FIG. 16.

FIG. 18 is a block diagram showing the configuration of the screensaver processing method of FIG. 16.

When an application 1810 receives external input, that is, a request for playing back a media on a full screen (resume_media), a video object 1815 registers a screensaver request with a controller 1820. Such registration can be performed when video is generated by a video object 1815, for example.

The controller 1820 determines whether registration is included in an existing screensaver processing related list and determines whether a request to enter the screensaver is received from a service interface 1830.

Here, the service interface 1830 transmits the request to enter the screensaver to the controller 1820, depending on whether "No operation" data according to timeout is received from an LSM 1860 which is a window manager of the device. For example, when "No operation" data according to timeout is received from the LSM 1860, the service interface 1830 transmits the request to enter the screensaver to the controller 1820.

The controller 1820 attempts to enter the screensaver according to the request of the service interface 1830 according to a voting method, unlike a conventional method. That is, the controller 1820 sends a splash screen entering request to the video object or application, for entering the screensaver, when the request to go to the screensaver is received from the service interface 1830.

The video object or application responds to the screensaver request of the controller 1820 and the response can be one of "ack" or "nack". "ack" means that the device is allowed to enter the screensaver (true) and "nack" means that the device is not allowed to enter screensaver.

Although only single application is assumed in the present specification, in the voting method according to the present invention, if one or more applications are present, an unanimity method is used for voting, that is, for a voting response to the request of the controller 1820. In other words, if a plurality of applications is present, all applications should transmit the same response. For example, in order to enter the screensaver, the responses of all applications should be "ack". However, if only one application transmits a response "nack", the controller 1820 can not transmit the request to enter the screensaver to the screensaver application 1840.

Alternatively, priority can be assigned to the responses of a plurality of applications and the controller 1820 can determine whether to enter the screensaver according to the response of an application having high priority if the responses of the applications are different. If the responses of the applications having the same priority are different, the controller 1820 can determine whether to enter the screensaver according to majority voting and can arbitrarily determine whether to enter the screensaver if majority voting is difficult. The controller 1820 can not transmit the request to go to the screensaver as a default if it is difficult to make a determination.

The controller 1820 requests that the screensaver application 1840 launch a screensaver application if it is determined that all the responses of the video object 1815 are "ack".

When the launch command is received from the controller 1820, the screensaver application 1840 sends the API "getScreenStatus" to the display manager 1850 and requests a video size. When the API is received, the display manager 1850 combines data, such as video size, location and video status, received from the video object and responds to the API. The application or video object can transmit the video size, the pipeline status, etc., which are generated simultaneously with or before the request of the controller 1820, to the display manager 1850. The pipeline status can include play, pause, delayed load, etc., for example. In addition, although not shown, the pipeline status can be checked via the media server.

The screensaver application 1840 executes the screensaver upon receiving the response to the API from the display manager 1850. Here, the screensaver application 180 can first check whether PIG video is present via the display manager 1850 before execution of the screensaver. The screensaver can be executed according to the checked result as follows. If video is not present or if only a UI is present, a fullscreen screensaver is executed and, if the video is PIG video, a PIG screensaver is executed. In the PIG screensaver, only a PIG area (PIG video size) is punched and the PIG screensaver is executed as shown in FIG. 15b. That is, the remaining area is displayed in the form of a banner or in gray.

Figure 19:
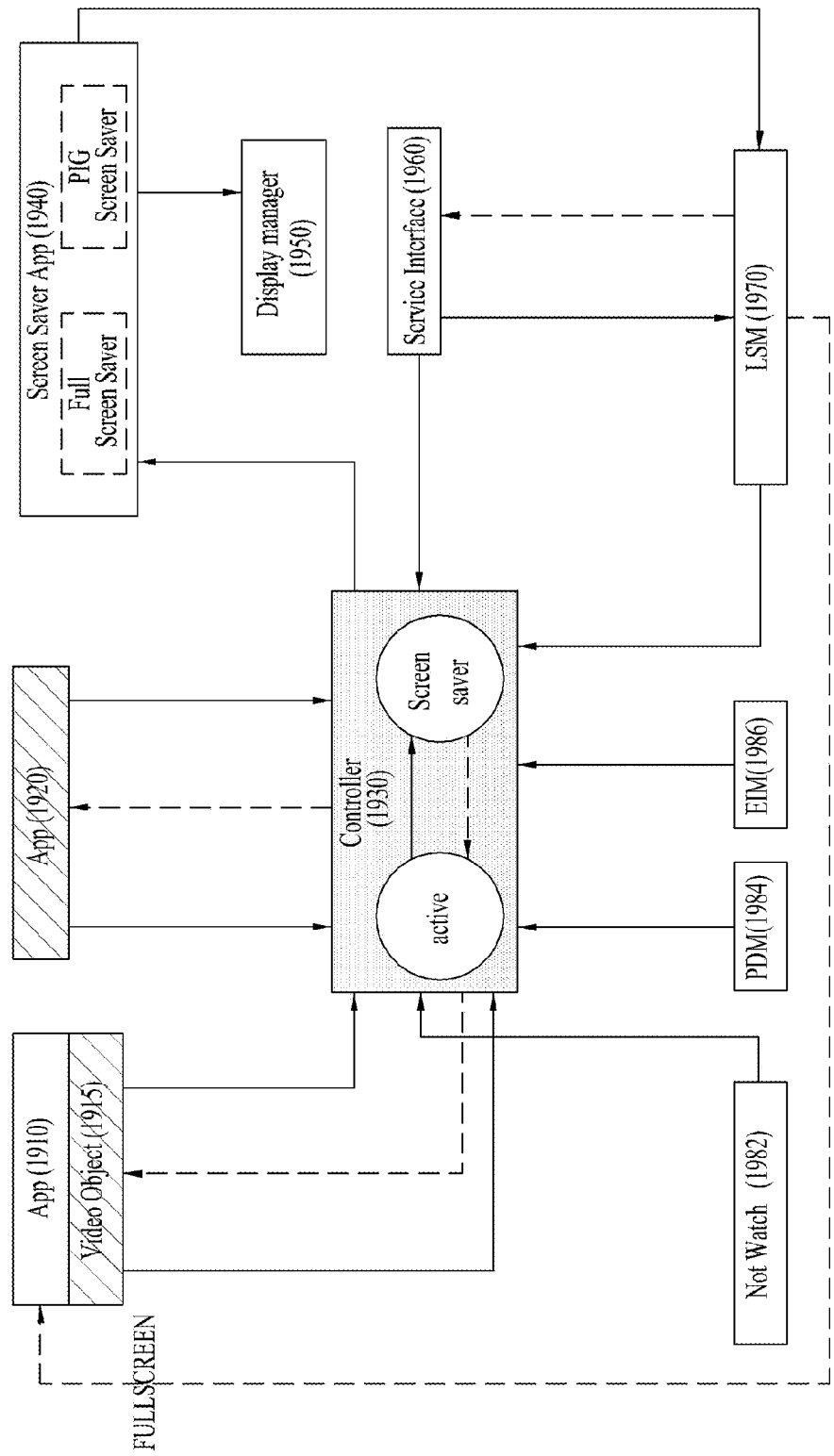
FIG. 19 is a diagram illustrating the screensaver processing configuration according to one embodiment of the present invention.

FIG. 19 is a diagram illustrating the configuration of the screensaver processing method according to one embodiment of the present invention.

The case in which one application is present has been described above. The digital device according to the present invention enables multitasking based on a webOS and a screensaver function can be supported even in a multitasking environment. For example, even in an app-on-app status of the multitasking environment, screensaver processing is required. That is, FIG. 19 shows an extension or a detailed configuration of screensaver processing in a digital device employing a voting method.

Referring to FIG. 19, two (plural) applications are shown. These applications will be defined as follows.

An application 1910 has a video object 1915, that is, a video playback scenario, like the application 1610 of FIG. 16. The application 1910 means an application supported by a platform, for example.

An application 1920 means an application which is not described with reference to FIG. 16, which does not have a video playback scenario but requires a determination as to whether to enter the screensaver. The application 1920 can include an application having a photo slide show scenario or an electronic picture frame application.

FIGS. 16 and 19 are similar to each other in terms of screensaver entrance.

For example, the video object 1915 is registered with a controller 1930 as a voter when video is generated. The controller 1930 determines whether the video object or the application is present in an existing voter list. At this time, the controller 1930 can not transmit a voting request for determining whether to enter the screensaver to the application or the video object, if it is determined that the application or the video object which is not included in the voter list is registered.

The application 1920 is registered with the controller 1930 as a voter at a desired time, for example, an application execution time. Similarly, the controller 1930 determines whether the application is included in the voter list as a voter and performs processing according to the determined result.

The controller 1930 ends registration of the applications as the voters and checks whether a request to enter (go to) the screen server is received from an interface 1960.

The interface 1960 registers no operation timeout with an LSM 1970 and transmits a request to go to the screensaver to the controller 1930 when timeout is received from the LSM 1970. No operation timeout means a time when the LSM which is the window manager does not receive input to the device. For example, the digital device sets no operation timeout to 2 minutes in the LSM 1970 and returns timeout, that is, a no-operation status, to the interface 1960 if no (valid) input is received for 2 minutes. The controller 1930 controls screensaver operation if the request to go to the screensaver is received from the interface 1960 while the device is in an active state, that is, while the device is activated.

The controller 1930 transmits a request to ask whether to enter the screen server to the registered applications or the video objects and receives votes, that is, responses or confirmations, from the applications.

As described above, the controller 1930 finally determines whether to go to the screensaver based on the responses or confirmations. Such a determination is unanimously made. That is, only if the confirmations of the applications are all "ack", screensaver entrance is attempted.

In contrast, if "nack" is received from only one application, the controller 1930 can defer screensaver entrance.

The controller 1930 switches from the active status to the screensaver status when "ack" is received from all the applications as the voting result. Simultaneously, the controller 1930 transmits a launch command to the screensaver application 1940.

The screensaver application 1940 is executed according to the transmitted launch command and transmits the API "getScreenStatus to the display manager 1950, which has received the video size, location, status data, etc. from the applications or the video objects, and receives a response thereto.

The screensaver application 1940 requests that the LSM 1970 should generate an overlay window for fullscreen screensaver or PIG screensaver operation based on the response of the display manager 1950 and outputs the screensaver at an uppermost level.

Therefore, the fullscreen or PIG screensaver operates on the screen of the display.

Thereafter, releasing the screensaver is determined by the controller 1930.

At this time, the controller 1930 can determine whether the screensaver is released using various factors.

The factors can include reception of certain input on a screen via the LSM 1970, a not watch service 1982, a physical device manager (PDM) 1984, an external input manager (EIM) 1986, etc.

First, the screensaver releasing factor received via the LSM 1970 includes key input of a user via a remote controller, pointer motion, etc., for example.

The screensaver releasing factor via the not watch service 1982 includes the case in which a user does not concentrate on a display screen, does not view the display screen, leaves the display screen or performs another operation via an eye-tracking sensor, a gesture sensor, a camera sensor, etc. The data of the camera sensor or the eye-tracking sensor can be further considered. In some cases, the factor of the LSM 1970 and the factor of the not watch service 1982 can overlap.

The PDM factor 1984 provides a service for a physical device. The PDM which is a module for managing a device includes a module for detecting hot plug-in of a USB device, managing a physical device connected to a system and providing a file system service for a storage device and a service for a USB device. The PDM module can include a USB memory, a CAM, a HID, an XPAD, a HDD, etc. Such a PDM factor can include factors other than the below-described EIM factor, for example.

The EIM factor 1986 includes a service for detecting hot plug-in for an external input device and providing device information to an application.

The controller 1930 can release execution of the screensaver based on at least one of the above factors. In this case, the controller 1930 switches from the screensaver status to the active status, transmits an API "closeAppID" to the screensaver application 1940, and requests to stop execution of the screensaver application. Execution of the screensaver at the uppermost layer is stopped according to reception of the API.

The controller 1930 can collect data related to screensaver releasing in the LSM 1970, the not watch service 1982, the PDM module 1984 and the EIM module 1986 using a polling method and receive the data from the modules when an event occurs.

Although not shown in FIGS. 16 to 19, applications which do not participate in voting can be displayed or executed on the screen along with the applications which participate in voting. The application(s) which do not participate in voting or the applications which participate in voting but are not included in the voting list in the controller 1930 can be ignored in terms of screensaver operation. That is, the digital device can ignore execution or voting of such applications in operation of the screensaver or arbitrarily determine screensaver operations of such applications.

Figure 20:
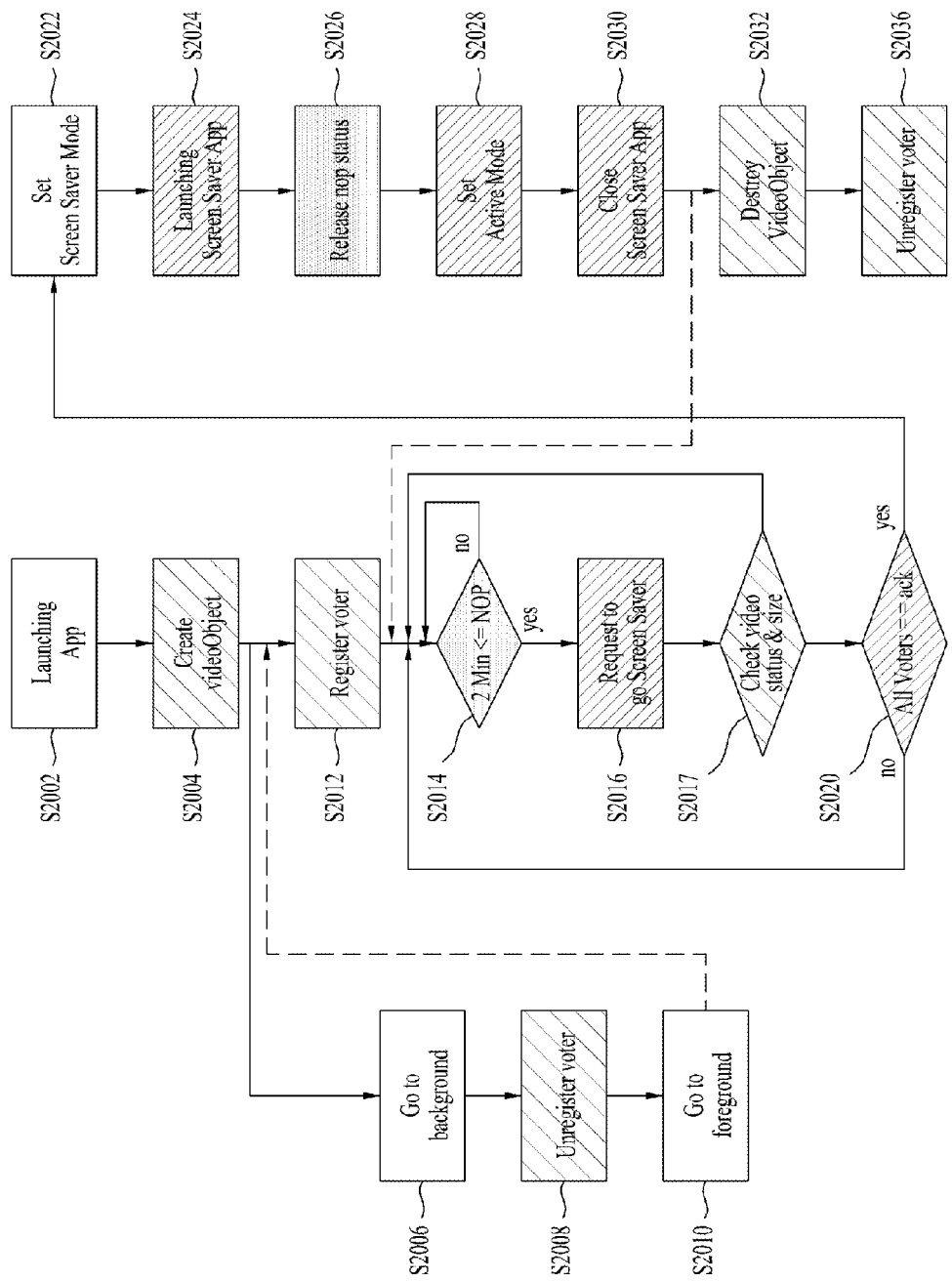
FIG. 20 is a flowchart illustrating a screensaver processing method according to one embodiment of the present invention.

FIG. 20 is a flowchart illustrating a screensaver processing method according to one embodiment of the present invention.

According to the present invention, a method of controlling a digital device includes receiving, by a controller, a first signal from a first application requesting registration as an application voter transmitting, by the controller, a second signal requesting a confirmation related to execute a second application to the first application when first status data is received from a service interface receiving, by the controller, a response to the second signal from the first application and executing, by the controller, the second application to enter a screensaver mode based on the received response.

The first application includes at least one of an application including video data and an application not including video data, and wherein the second application is an application dedicated to the screensaver mode. The method further comprises generating, by the controller, a video object when the first application is an application including the video data. The first signal is received from the application when video data is generated or when the video object is generated. The method further comprises determining, by the controller, whether or not the first application or the generated object is in a list related to the registration which is prestored in a memory and reserving or rejecting the registration when the first application or the generated object is not included in the list. The first status data is generated by a timeout status in which any input to the digital device is not received during a predetermined time. The method further comprises receiving, by the controller, second status data for the corresponding video data from the generated video object when the received response is received. The second status data for the corresponding video data includes at least one of a size of the outputted video data, an area or a location of the outputted video data, and video status data, the video status data including information indicating a reproduction or stop of the video data. The second application is only executed when the received second signal includes a signal of acking. The step of executing the second application includes launching, by the controller, the second application and executing, by the controller, the second application at an uppermost layer on a screen via the launched second application. The second application determines any one of a fullscreen and a picture in graphic (PIG) to execute the screensaver mode. The method further comprises receiving, by the controller, a third signal requesting to release execution of the second application and transmitting, by the controller, a control command in response to the received third signal to the second application. The third signal includes at least one of user input for releasing a timeout status corresponding to the first status data, an external input manager (EIM) signal, a physical device manager (PDM) signal, and a not watch service signal. The first application transmits the first signal when the first application is located in a foreground, and wherein the first application does not transmit the first signal when the first application is located in a background.

The digital device launches one or more applications (S2002) and the launched application(s) create video objects (S2004). The created video objects register voters with the controller (S2012). At this time, the applications can include an application which does not include video. The application which does not include video can bypass step S2004.

If the application goes to a background (S2006), the video objects unregister the voters (S2008) and, if the application returns to a foreground (S2010), the applications register the voters with the controller (S2012).

In other words, as in step S2006, when the application goes to the background, registration of the voter of step S2012 can be released or the voter can be unregistered. At this time, when the application goes to the foreground, the voter can not be released, because only the application in the foreground determines voting. If the application goes to the background, "ack" is always transmitted as a response to the request to go to the screensaver, because the foreground application can coincide with priority or user's intention rather than the background application in terms of screen saving entrance.

A determination as to whether no operation (NOP) timeout occurs is made via the LSM (S2014). If timeout occurs, the interface requests to go to the screensaver from the controller and the controller requests voting for going to the screensaver from each application according to the above request (S2016).

After step S2016, the video object checks the video location, size and video status, etc. and responds to the voting request (S2018).

If the response of step S2018 is "nack", a determination as to whether timeout (NOP) occurs is made again. If the response of step S2018 is "ack", a determination as to whether the responses of all applications registered as the voter are "ack" is made (S2020). At this time, if the responses of all applications are not "ack", the method returns to step S2014. If the responses of all applications are "ack" in step S2020, the controller switches from the active mode to the screensaver mode (S2022). At this time, the controller requests launching of the screensaver application simultaneously with step S2022.

If the screensaver application is launched (S2024), the screensaver is executed on the screen.

Thereafter, the controller determines whether execution of the screensaver is released and switches from the screensaver mode to the active mode (S2028) if the NOP status is released (S2026). Thereafter, the controller requests to close the screensaver from the screensaver application and the screensaver application closes the screensaver, which is being executed at an uppermost layer, is close according to the request (S2030).

Thereafter, if a request to stop execution of the application is received, the already created video object is destroyed (S2032) and the voter is unregistered (S2034). As described above, the application which does not include the video object can bypass steps S2032 and S2034.

The screensaver processing method in the controller 1820 based on the voting screen of one or more applications has been described above.

Hereinafter, as another embodiment, the screensaver can not be processed based on communication (request and response) between the controller and the application according to the voting scenario but a determination as to whether to go to the screensaver is made by the service. In the present invention, this is referred to as a service scenario. The service used herein has a meaning different from that of a general service. For example, the service can mean a processor including a media server, a display manager and/or a controller, that is, a hardware configuration or a process executed thereby. Accordingly, for better understanding of the present invention and convenience of description, assume that the service includes a media server, a display manager, a controller, etc.

The present invention is similar to the above description in terms of releasing or completion of the screensaver and thus a repeated description will be omitted.

The digital device executes the screensaver in order to save the power of the device, competitively applies the voting scenario and the service scenario and executes the screensaver at the uppermost layer of the screen of the device when going to the screensaver according to any one scenario. The screensaver competitively executed according to the scenario ends if interruption or event for ending the screensaver occurs.

Although not shown in the present specification, interruption or event for ending execution of the screensaver aims at minimizing inconvenience of a user upon viewing the device in addition to power saving and thus execution of the screensaver can not end if an event which is not related to the purpose of the screensaver, that is, an event for providing any information to the user, occurs in the device. For example, while the screensaver is executed, downloading of video, audio, images, etc. requested before execution of the screensaver is finished, the device can display a toast popup message on a screen. At this time, since the device only provides information to the user, execution of the screensaver can not end. Even when the screensaver is executed, a popup message or OSD image for providing a device operation result or any information to the user can be provided during a predetermined time until execution of the screensaver ends. Accordingly, the user can determine whether execution of the screensaver ends according to the above information during execution of the screensaver. If the device provides a plurality of data, such as popup messages, to the user, the device can provide the data on the screen so as not to overlap each other. If the number of data is equal to or greater than a predetermined number, in order to enable the user to easily identify the data, audio can be provided while the data is displayed on the screen. Audio can be provided even when the number of messages is only one.

According to one of the various embodiments of the present invention, it is possible to provide an adaptive screensaver control or processing method in consideration of the status of a service or application of a digital device. It is possible to provide an adaptive screensaver control or processing method if the digital device supports multitasking. By adaptively processing the screensaver according to the status of the digital device based on user's intention or for power saving, it is possible to increase user convenience or improve product satisfaction.

The digital device and the content processing method of the digital device according to the foregoing embodiments are not restricted to the embodiments set forth herein. Therefore, variations and combinations of the exemplary embodiments set forth herein can fall within the scope of the present invention.

The method for operating the digital device according to the foregoing embodiments can be implemented as code that can be written to a computer-readable recording medium and can thus be read by a processor. The computer-readable recording medium can be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments to realize the embodiments herein can be construed by one of ordinary skill in the art Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a digital device, the method comprising:
    receiving, by a controller, a first signal requesting registration as an application voter that determines whether to execute a second application, from a first application;
    transmitting, by the controller, a second signal requesting a confirmation whether to execute the second application to the first application when first status data is received from a service interface;
    receiving, by the controller, a response from the first application; and
    executing, by the controller, the second application to enter a screensaver mode based on the received response,
    wherein the first application includes at least one of an application including video data and an application not including video data, and the second application is an application dedicated to the screensaver mode.

2. The method of claim 1 further comprises:
generating, by the controller, a video object when the first application is an application including the video data.

3. The method of claim 2, wherein the first signal is received from the application when video data is generated or when the video object is generated.

4. The method of claim 2, further comprising:
determining, by the controller, whether or not the first application or the generated object is in a list related to the registration which is prestored in a memory; and
reserving or rejecting the registration when the first application or the generated object is not included in the list.

5. The method of claim 1, wherein the first status data is generated by a timeout status in which any input to the digital device is not received during a predetermined time.

6. The method of claim 2 further comprises receiving, by the controller, second status data for the corresponding video data from the generated video object when the received response is received.

7. The method of claim 6, wherein the second status data for the corresponding video data includes at least one of a size of the outputted video data, an area or a location of the outputted video data, and video status data, the video status data including information indicating a reproduction or stop of the video data.

8. The method of claim 1, wherein the second application is only executed when the received second signal includes a signal of acking.

9. The method of claim 1, wherein the step of executing the second application includes:
launching, by the controller, the second application; and
executing, by the controller, the second application at an uppermost layer on a screen via the launched second application.

10. The method of claim 9, wherein the second application determines any one of a fullscreen and a picture in graphic (PIG) to execute the screensaver mode.

11. The method of claim 1 further comprising:
receiving, by the controller, a third signal requesting to release execution of the second application; and
transmitting, by the controller, a control command in response to the received third signal to the second application.

12. The method of claim 11, wherein the third signal includes at least one of user input for releasing a timeout status corresponding to the first status data, an external input manager (EIM) signal, a physical device manager (PDM) signal, and a not watch service signal.

13. The method of claim 1, wherein the first application transmits the first signal when the first application is located in a foreground, and wherein the first application does not transmit the first signal when the first application is located in a background.

14. A digital device comprising:
a display manager to manage a display window of the digital device and to generate and to transmit a plurality of status data of the digital device to a controller; and
the controller to receive a first signal requesting registration as an application voter that determines whether to execute a second application, from a first application, to transmit a second signal requesting a confirmation whether to execute the second application to the first application when first status data is received from a service interface, to receive a response from the first application, and to execute the second application to enter a screensaver mode based on the received response,
wherein the first application includes at least one of an application including video data and an application not including video data, and wherein the second application is an application dedicated to the screensaver mode.

15. The digital device of claim 14, wherein the controller generates a video object when the first application is an application including the video data.

16. The digital device of claim 14, wherein the first signal is received from the application when video data is generated or when the video object is generated.

17. The digital device of claim 16, wherein the controller only executes the second application when the received second signal includes a signal of acking.

18. The digital device of claim 16, wherein the controller launches the second application and executes the second application at an uppermost layer on a screen via the launched second application.

19. The digital device of claim 16, wherein the controller receives a third signal requesting to release execution of the second application and transmits a control command in response to the received third signal to the second application.

20. The digital device of claim 19, wherein the third signal includes at least one of user input for releasing a timeout status corresponding to the first status data, an external input manager (EIM) signal, a physical device manager (PDM) signal, and a not watch service signal.

21. The digital device of claim 16, wherein the first application transmits the first signal when the application is located in a foreground, and wherein the first application does not transmit the first signal when the first application is located in a background.

22. The digital device of claim 14, wherein the controller determines whether or not the first application or the generated object is in a list related to the registration which is prestored in a memory and reserve or reject the registration when the first application or the generated object is not included in the list.

23. The digital device of claim 14, wherein the first status data is generated by a timeout status in which any input to the digital device is not received during a predetermined time.

24. The digital device of claim 14, wherein the controller receives second status data for the corresponding video data from the generated video object when the received response is received.

25. The digital device of claim 24, wherein the second status data for the corresponding video data includes at least one of a size of the outputted video data, an area or a location of the outputted video data, and video status data, the video status data including information indicating a reproduction or stop of the video data.

26. The digital device of claim 24, wherein the second application determines any one of a fullscreen and a picture in graphic (PIG) to execute the screensaver mode.

* * * * *